(12) United States Patent
Cesic et al.

(10) Patent No.: US 11,524,846 B2
(45) Date of Patent: Dec. 13, 2022

(54) POSE DETERMINATION BY AUTONOMOUS ROBOTS IN A FACILITY CONTEXT

(71) Applicant: Gideon Brothers d.o.o., Osijek (HR)

(72) Inventors: Josip Cesic, Zagreb (HR); Daniel Guja, Dugo Selo (HR); Juraj Radic, Donji Stupnik (HR)

(73) Assignee: GIDEON BROTHERS D.O.O., Osijek (HR)

( * ) Notice: Subject to any disclaimer, the term of this patent is extended or adjusted under 35 U.S.C. 154(b) by 33 days.

(21) Appl. No.: 17/138,432

(22) Filed: Dec. 30, 2020

(65) Prior Publication Data

US 2022/0121837 A1    Apr. 21, 2022

Related U.S. Application Data

(60) Provisional application No. 63/111,480, filed on Nov. 9, 2020, provisional application No. 63/093,682, filed on Oct. 19, 2020.

(51) Int. Cl.
*G06V 20/64* (2022.01)
*B65G 1/06* (2006.01)
(Continued)

(52) U.S. Cl.
CPC ............ *B65G 1/06* (2013.01); *B65G 1/1375* (2013.01); *B66F 9/063* (2013.01); *G05D 1/0044* (2013.01);
(Continued)

(58) Field of Classification Search
None
See application file for complete search history.

(56) References Cited

U.S. PATENT DOCUMENTS 9,471,062 B1   10/2016   Theobald
9,606,544 B2   3/2017    Gariepy et al.
(Continued)

FOREIGN PATENT DOCUMENTS

CN    108280856 A  *  7/2018  ............... G06T 7/75
EP    3656702 A1       5/2020
(Continued)

OTHER PUBLICATIONS

PCT International Search Report and Written Opinion, PCT Application No. PCT/IB2021/059263, dated Jan. 31, 2022, 15 pages.
(Continued)

*Primary Examiner* — Bernard Krasnic
(74) *Attorney, Agent, or Firm* — Fenwick & West LLP

(57) ABSTRACT

A system and a method are disclosed where an autonomous robot captures an image of an object to be transported from a source to a destination. The robot generates a bounding box within the image surrounding the object. The robot applies a machine-learned model to the image with the bounding box, the machine-learned model configured to identify an object type of the object, and to identify features of the object based on the identified object type and the image. The robot determines which of the identified features of the object are visible to the autonomous robot, and determines a three-dimensional pose of the object based on the features determined to be visible to the autonomous robot.

18 Claims, 18 Drawing Sheets

(51) Int. Cl.
  *B66F 9/06* (2006.01)
  *G05D 1/02* (2020.01)
  *G05D 1/00* (2006.01)
  *B65G 1/137* (2006.01)
  *G06V 20/10* (2022.01)
  *G06F 3/0486* (2013.01)
  *G06V 30/194* (2022.01)
  *G06K 9/62* (2022.01)
  *G06F 3/04847* (2022.01)

(52) U.S. Cl.
  CPC ......... *G05D 1/0212* (2013.01); *G05D 1/0214* (2013.01); *G05D 1/0231* (2013.01); *G05D 1/0297* (2013.01); *G06F 3/0486* (2013.01); *G06K 9/6217* (2013.01); *G06V 20/10* (2022.01); *G06V 20/64* (2022.01); *G06V 30/194* (2022.01); *B65G 2203/0233* (2013.01); *B65G 2203/041* (2013.01); *G05D 2201/0216* (2013.01); *G06F 3/04847* (2013.01)

(56) References Cited

U.S. PATENT DOCUMENTS

| | | |
|---|---|---|
| 9,688,288 B1 | 6/2017 | Lathrop et al. |
| 9,804,594 B2 | 10/2017 | Gariepy et al. |
| 9,886,035 B1 | 2/2018 | Watts et al. |
| 9,891,630 B2 | 2/2018 | Gariepy et al. |
| 9,963,155 B2 | 5/2018 | Gariepy et al. |
| 10,102,429 B2 | 10/2018 | Schnittman |
| 10,120,390 B2 | 11/2018 | Gariepy et al. |
| 10,191,494 B2 | 1/2019 | Gariepy et al. |
| 10,241,515 B2 | 3/2019 | Gariepy et al. |
| 10,386,851 B2 | 8/2019 | Moore et al. |
| 10,417,781 B1* | 9/2019 | Konolige ............. G06V 10/462 |
| 10,429,847 B2 | 10/2019 | Moore et al. |
| 10,462,076 B2 | 10/2019 | Gariepy et al. |
| 10,809,734 B2 | 10/2020 | De Castro |
| 2009/0326713 A1 | 12/2009 | Moriya |
| 2012/0152877 A1 | 6/2012 | Tadayon |
| 2014/0276001 A1* | 9/2014 | Ungi ..................... A61B 5/064 600/424 |
| 2014/0277691 A1 | 9/2014 | Jacobus et al. |
| 2015/0359185 A1 | 12/2015 | Guy |
| 2018/0029797 A1 | 2/2018 | Hance et al. |
| 2019/0064845 A1 | 2/2019 | Pardasani et al. |
| 2019/0122157 A1 | 4/2019 | Jenkins et al. |
| 2019/0161274 A1 | 5/2019 | Paschall et al. |
| 2019/0228597 A1 | 7/2019 | Brown et al. |
| 2019/0243384 A1 | 8/2019 | Chopra et al. |
| 2019/0265704 A1 | 8/2019 | Gariepy et al. |
| 2020/0016754 A1 | 1/2020 | Skubch |
| 2020/0133305 A1 | 4/2020 | Gariepy et al. |
| 2020/0164895 A1 | 5/2020 | Boss et al. |
| 2020/0320401 A1* | 10/2020 | Jampani ................. G06V 10/82 |
| 2022/0084238 A1* | 3/2022 | Tang ..................... G06V 10/40 |
| 2022/0084241 A1* | 3/2022 | Dikhale ................ G01S 13/867 |

FOREIGN PATENT DOCUMENTS

| | | | |
|---|---|---|---|
| KR | 20180114200 A | * 10/2018 | |
| WO | WO 2018/039337 A1 | 3/2018 | |
| WO | WO 2019/166517 A1 | 9/2019 | |
| WO | WO 2019/166518 A1 | 9/2019 | |
| WO | WO-2020215772 A1 | * 10/2020 | ............ B66F 17/003 |

OTHER PUBLICATIONS

PCT Invitation to Pay, PCT Application No. PCT/IB2021/059263, dated Dec. 9, 2021, 14 pages.

United States Office Action, U.S. Appl. No. 17/138,444, filed Oct. 25, 2022, 14 pages.

* cited by examiner

1400

1402
identify, by a central communication system, a source area within a facility comprising a plurality of objects, the source area defined by a source boundary

1404
determine, by the central communication system, a destination area within the facility to which the plurality of objects are to be transported and unloaded, the destination area defined by a destination boundary

1406
select, by the central communication system, one or more robots of a fleet of robots within the facility based on one or more of a capability of the robots and a location of the robots within the facility

1408
provide, by the central communication system, an instruction to each selected robot to transport the plurality of objects from the source area to the destination area, each robot configured to autonomously select an object of the plurality of objects based on a position and location of the object within the source area, transport the selected object through the facility from the source area to a destination area along a route selected by the robot, and unload the selected object at a location within the destination area selected based on a first number of objects of the plurality of objects already unloaded within the destination area and based on a second number of objects of the plurality of objects yet to be unloaded within the destination area

1502
capture, by an autonomous robot, an image of an object to be transported from a source to a destination, wherein the image is a red-green-blue (RGB) image or a grayscale image

1504
generate, by the autonomous robot, a bounding box within the image surrounding the object

1506
apply, by the autonomous robot, a machine-learned model to the image with the bounding box, the machine-learned model configured to identify an object type of the object, and to identify features of the object based on the identified object type and the image

1508
determine, by the autonomous robot, which of the identified features of the object are visible to the autonomous robot

1510
determine, by the autonomous robot, a three-dimensional pose of the object based on the features determined to be visible to the autonomous robot

1602
generate for display to a remote operator a user interface comprising a map, the map comprising visual representations of a source area, a plurality of candidate robots, and a plurality of candidate destination areas

1604
receive, via the user interface, a selection of a visual representation of a candidate robot of the plurality of candidate robots

1606
detect a drag-and-drop gesture within the user interface of the visual representation of the candidate robot being dragged-and-dropped to a visual representation of a candidate destination area of the plurality of candidate destination areas

1608
responsive to detecting the drag-and-drop gesture, generate a mission, wherein the mission causes the candidate robot to autonomously transport an object from the source area to the candidate destination area

1702
traverse, by an autonomous mobile robot, along a route based on parameters corresponding to a first mode, the parameters comprising a first minimum distance to be maintained between the autonomous mobile robot and an obstacle

1704
determine, by the autonomous mobile robot, that the route cannot be continued without a distance between the autonomous mobile robot and a detected obstacle becoming less than the first minimum distance

1706
responsive to determining that the route cannot be continued, determine whether the route can be continued without the distance between the autonomous mobile robot and the detected obstacle becoming less than a second minimum distance less than the first minimum distance, the second minimum distance corresponding to a second mode

1708
responsive to determining that the route can be continued without the distance between the autonomous mobile robot and the detected obstacle becoming less than the second minimum distance, configure the autonomous mobile robot to operate in second mode and continuing traversal of the route

1802
traverse, by a robot operating using a first traversal protocol, autonomously along a first route that is defined by markers that are detectable by the robot, wherein the robot is configured to move only based on a presence and type of each marker when the robot is configured to operate based on the first traversal protocol

1804
detect, while traversing along the route, a triggering condition corresponding to a change in operation by the robot from the first traversal protocol to a second traversal protocol

1806
responsive to detecting the triggering condition, configure the robot to operate in the second traversal protocol, wherein the robot, when configured to operate based on the second traversal protocol, determines a second route autonomously without regard to a presence of any of the markers

FIG. 18

POSE DETERMINATION BY AUTONOMOUS ROBOTS IN A FACILITY CONTEXT

CROSS REFERENCE TO RELATED APPLICATIONS

This application claims the benefit of U.S. Provisional Application No. 63/111,480, filed Nov. 9, 2020, as well as U.S. Provisional Application No. 63/093,682, filed Oct. 19, 2020, the disclosures of which are hereby incorporated by reference herein in their entireties.

TECHNICAL FIELD

The disclosure generally relates to the field of autonomous robotics, and more specifically to determining, by an autonomous robot, a pose of an object to be transported.

BACKGROUND

Existing systems are limited in adapting to unexpected circumstances in immediate environments. For example, where a robot is to unload a truck where pallets are expected to be organized in the manner that the pallets were loaded into the truck, and the pallets shifted during transportation to slightly different positions, the robot is unable to adapt. That is, existing robots must find objects, such as pallets, within a few centimeters of where they expect to find those objects, otherwise their assignment will fail. Thus, the robot fails to perform its assigned function until the problem is rectified (e.g., the pallets are manually shifted back to their original organization). These limitations result in downstream technological inefficiencies, such as unnecessary fuel consumption in robots expending fuel in attempting to perform an assigned activity only to fail in doing so, and then in expending further fuel in relocating until the problem is rectified. Moreover, where a robot is to perform a manipulation on which another robot is to take over, and where that manipulation is off even by a marginal amount (e.g., 1-2 centimeters as mentioned above), downstream assignment failures will occur. These failures result in a need for a human being to do the intended job of a robot, thus resulting in further delays and inefficiencies.

Yet further, existing robots used for unloading pallets are dependent on receiving information about how the pallets were loaded. That is, exact positions of the pallets and other details about the loading process must be known to an unloading robot for it to successfully unload the pallets. This dependency prevents flexibility on the unloading process, in that, should a loading process need to change from what was planned, then the unloading process would not be able to continue.

SUMMARY

Systems and methods are disclosed herein that enable real-time or near-real-time understanding of facility environment that obviate the need for micro-level understanding of expected location of objects. A three-dimensional (3D) map is used and frequently updated by a central communication system and robots interacting therewith that establish general location of objects within a facility. Even where an object is not exactly where expected, when the robot approaches that object, the robot is able to identify the object and analyze the object's pose to determine whether the object is manipulatable in accordance with mission parameters, and the robot is able to go on with the mission without disruption or a need for manual intervention. Thus, there is no longer a need for micro-level precision (e.g., 1-2 cm precision), and instead, macro-level precision is sufficient (e.g., precision to half of an object's dimension, such as 40 cm for an 80 cm wide pallet). Moreover, there is no longer a need for a robot assigned to unload an object to know information about how the object was loaded.

In an embodiment, an autonomous mobile robot (AMR) captures an image of an object to be transported from a source to a destination, wherein the image is a red-green-blue (RGB) image or a grayscale image. The AMR generates a bounding box within the image surrounding the object. The AMR applies a machine-learned model to the image with the bounding box, the machine-learned model configured to identify an object type of the object, and to identify features of the object based on the identified object type and the image. The AMR determines which of the identified features of the object are visible to the autonomous robot, and determines a three-dimensional pose of the object based on the features determined to be visible to the autonomous robot.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 14 depicts an illustrative flowchart of a process for causing a robot to execute a mission, in accordance with one embodiment.

FIG. 15 depicts an illustrative flowchart of a process for a robot to determine a three-dimensional pose of an object, in accordance with one embodiment.

FIG. 16 depicts an illustrative flowchart of a process for using an improved user interface to establish a mission, in accordance with one embodiment.

FIG. 17 depicts an illustrative flowchart of a process for toggling a mode of operation when encountering an obstacle, in accordance with one embodiment.

FIG. 18 depicts an illustrative flowchart of a process for toggling a traversal protocol of a robot based on a triggering condition, in accordance with one embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Environment

Figure 1:
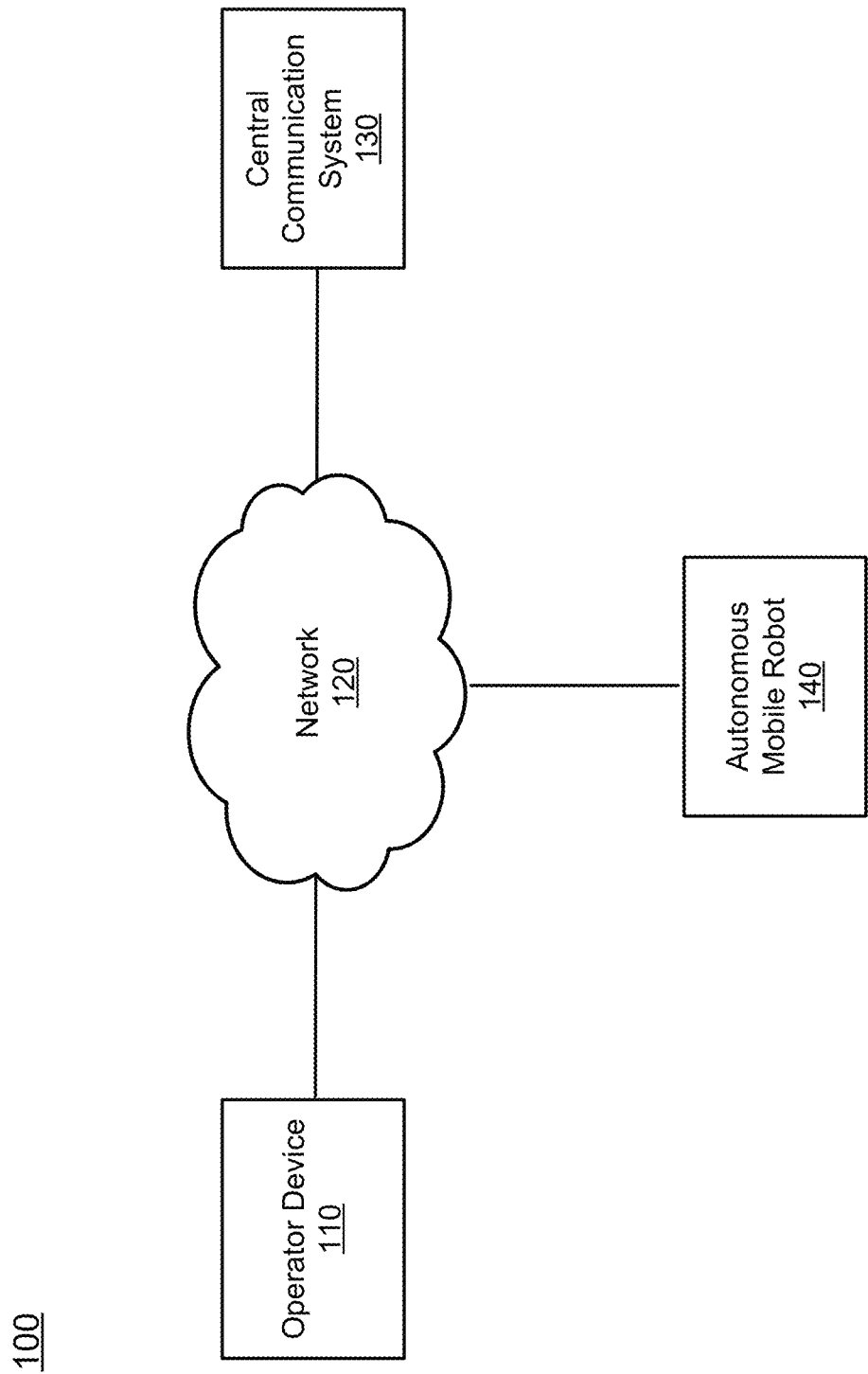
FIG. 1 illustrates one embodiment of an environment for operating an autonomous mobile robot using a central communication system.

FIG. 1 illustrates one embodiment of an environment for operating an autonomous mobile robot using a central communication system. Environment 100 includes operator device 110, network 120, central communication system 130, and autonomous mobile robot 140. Environment 100 is typically described herein as a warehouse environment for convenience and illustrative purposes, however, environment 100 may be any environment, such as a manufacturing environment. Environment 100 need not be limited to a defined space (e.g., an interior of a warehouse), and may include any areas that are within the purview of instructions of an autonomous mobile robot (e.g., parking lots, loading docks, and so on that are outside of a warehouse space). While operator device 110 and central communication system 130 are depicted as being within environment 100, this is merely for convenience; these devices may be located outside of environment 100 (e.g., at a home, office, data center, cloud environment, etc.).

Operator device 110 may be any client device that interfaces one or more human operators with one or more autonomous mobile robots of environment 100 and/or central communication system 130. Exemplary client devices include smartphones, tablets, personal computers, kiosks, and so on. While only one operator device 110 is depicted, this is merely for convenience, and a human operator may use any number of operator devices to interface with autonomous mobile robots 140 and/or central communication system 130. Operator device 110 may have a dedicated application installed thereon (e.g., downloaded from central communication system 130) for interfacing with autonomous mobile robot 140 and/or central communication system 130. Alternatively, or additionally, operator device 110 may access such an application by way of a browser. References to operator device 110 in the singular are done for convenience only, and equally apply to a plurality of operator devices.

Network 120 may be any network suitable for connecting operator device 110 with central communication system 130 and/or autonomous mobile robot 140. Exemplary networks may include a local area network, a wide area network, the Internet, an ad hoc network, and so on. In some embodiments, network 120 may be a closed network that is not connected to the Internet (e.g., to heighten security and prevent external parties from interacting with central communication system 130 and/or autonomous mobile robot 140). Such embodiments may be particularly advantageous where client device 110 is within the boundaries of environment 100.

Central communication system 130 acts as a central controller for a fleet of one or more robots including autonomous mobile robot 140. Central communication system 130 receives information from the fleet and/or operator device 110 and uses that information to make decisions about activity to be performed by the fleet. Central communication system 130 may be installed on one device, or may be distributed across multiple devices. Central communication system 130 may be located within environment 100 or may be located outside of environment 100 (e.g., in a cloud implementation). Further details about the operation of central communication system 130 are described below with reference to FIG. 2.

Autonomous mobile robot 140 may be any robot configured to act autonomously with respect to a command. For example, in the warehouse environment, autonomous mobile robot 140 may be commanded to move an object from a source area to a destination area, and may be configured to make decisions autonomously as to how to optimally perform this function (e.g., which side to lift the object from, which route to take, and so on). Autonomous mobile robot 140 may be any robot suitable for performing a commanded function. Exemplary autonomous mobile robots include vehicles (e.g., forklift, mobile storage container, etc.) and planted devices that are affixed to a surface (e.g., mechanical arms). Further details about the functionality of autonomous mobile robot 140 are described in further detail below with respect to FIG. 3. References to autonomous mobile robot 140 in the singular are made for convenience and are non-limiting; these references equally apply to scenarios including multiple autonomous mobile robots.

Exemplary Central Communication System Configuration

Figure 2:
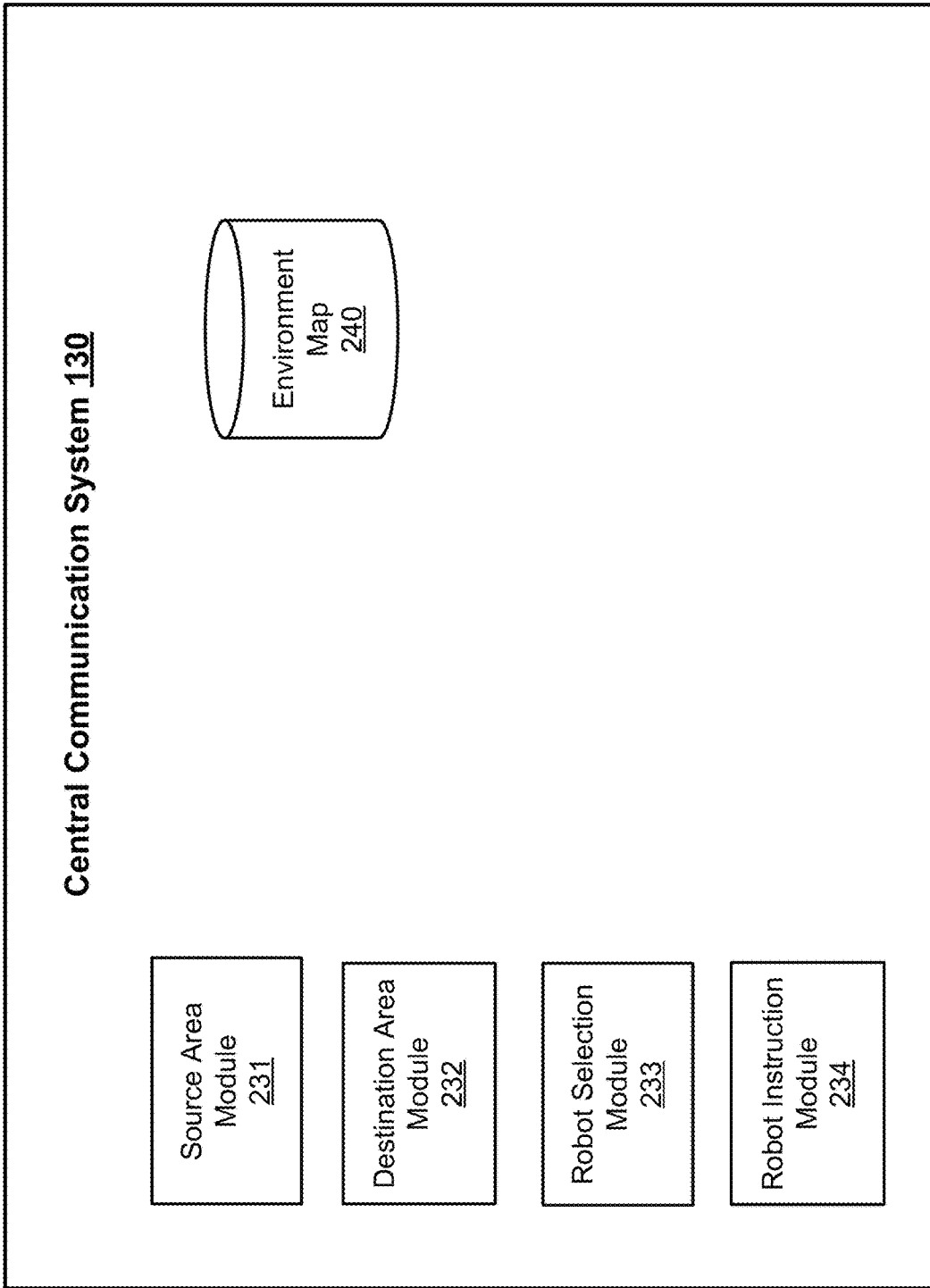
FIG. 2 illustrates one embodiment of exemplary modules and data stores used by the central communication system.

FIG. 2 illustrates one embodiment of exemplary modules and data stores used by the central communication system. As depicted in FIG. 2, central communication system 130 includes source area module 231, destination area module 232, robot selection module 233, and robot instruction module 234, as well as environment map 240. The modules and databases depicted in FIG. 2 are merely exemplary; fewer or more modules and/or databases may be used by central communication system 130 to achieve the functionality disclosed herein.

Source area module 231 identifies a source area. The term source area, as used herein, may refer to either a single point in a facility, several points in a facility, or a region surrounded by a boundary (sometimes referred to herein as a source boundary) within which a robot is to manipulate objects (e.g., pick up objects for transfer to another area). In an embodiment, source area module 231 receives input from operator device 110 that defines the point(s) and/or region that form the source area. For example, source area module 231 may cause operator device 110 to display a user interface including a map of the facility, within which the user of operator device 110 may provide input showing point(s) and/or drawing a region whose boundaries define the source area. In an embodiment, source area module 231 may receive input from one or more robots (e.g., image and/or depth sensor information showing objects known to need to be moved (e.g., within a predefined load dock)), and may automatically determine a source area to include a region within a boundary that surrounds the detected objects. In either embodiment, the source area may change dynamically as objects are manipulated (e.g., source area module 232 may shrink the size of the source area by moving boundaries inward as objects are transported out of the source area, and/or may increase the size of the source area by moving boundaries outward as new objects are detected).

Destination area module 232 identifies a destination area. The term destination area, as used herein, may refer to either a single point in a facility, several points in a facility, or a region surrounded by a boundary (sometimes referred to herein as a destination boundary) within which a robot is to manipulate objects (e.g., drop an object off to rest). For example, where the objects are pallets in a warehouse setting, the destination area may include several pallet stands at different points in the facility, any of which may be used to drop off a pallet. Destination area module 232 may identify the destination area in any manner described above with respect to a source area, and may also identify the destination area using additional means.

Destination area module 232 may determine the destination area based on information about the source area and/or the objects to be transported. Objects in the source area may have certain associated rules that add constraints to the destination area. For example, there may be a requirement that the objects be placed in a space having a predefined property (e.g., a pallet must be placed on a pallet stand, and thus the destination area must have a pallet stand for each pallet to be moved). As another example, there may be a requirement that the objects be placed at least a threshold distance away from the destination area boundary, and thus, destination area module 232 may require a human draw the boundary at least at this distance and/or may populate the destination boundary automatically according to this rule (and thus, the boundary must be drawn at least that distance away). Yet further, destination area module 232 may require that the volume of the destination area is at least large enough to accommodate all of the objects to be transported that are initially within the source area.

Source area module 231 and destination area module 232 may, in addition to, or alternative to, using rules to determine their respective boundaries, may use machine learning models to determine their respective boundaries. The models may be trained to take information as input, such as some or all of the above-mentioned constraints, sensory data, map data, object detection data, and so on, and to output boundaries based thereon. The models may be trained using prior mission data, where operators have defined or refined missions based on various parameters and constraints.

Robot selection module 233 selects one or more robots that are to transport objects from the source area to the destination area. In an embodiment, robot selection module 233 performs this selection based on one or more of a capability of the robots and a location of the robots within the facility. The term capability, as used herein, refers to a robot's ability to perform a task related to manipulation of an object. For example, if an object must be lifted, the robot must have the capability to lift objects, to lift an object having at least the weight of the given object to be lifted, and so on. Other capabilities may include an ability to push an object, an ability to drive an object (e.g., a mechanical arm may have an ability to lift an object, but may be unable to drive an object because it is affixed to, e.g., the ground), and so on. Further capabilities may include lifting and then transporting objects, hooking and then towing objects, tunneling and then transporting objects, using robots in combination with one another (e.g., an arm or other manipulates an object (e.g., lifts), places on another robot, and the robot then drives to the destination with the object). These examples are merely exemplary and non-exhaustive. Robot selection module 233 may determine required capabilities to manipulate the object(s) at issue, and may select one or more robots that satisfy those capabilities.

In terms of location, robot selection module 233 may select one or more robots based on their location to the source area and/or the destination area. For example, robot selection module 233 may determine one or more robots that are closest to the source area, and may select those robot(s) to manipulate the object(s) in the source area. Robot selection module 233 may select the robot(s) based on additional factors, such as an amount of objects to be manipulated, capacity of the robot (e.g., how many objects can the robot carry at once; sensors the robot is equipped with; etc.), speed of the robot, and so on. In an embodiment, robot selection module 233 may select robots based on a state of one or more robot's battery (e.g., a closer robot may be passed up for a further robot because the closer robot has insufficient battery to complete the task). In an embodiment, robot selection module 233 may select robots based on their internal health status (e.g., where a robot is reporting an internal temperature close to overheating, that robot may be passed up even if it otherwise optimal, to allow that robot to cool down). Other internal health status parameters may include battery or fuel levels, maintenance status, and so on. Yet further factors may include future orders, a scheduling strategy that incorporates a longer horizon window (e.g., a robot that is optimal to be used now may, if used now, result in inefficiencies (e.g., depleted battery level or sub-optimal location), given a future task for that robot), a scheduling strategy that incorporates external processes, a scheduling strategy that results from information exchanged between higher level systems (e.g., WMS, ERP, EMS, etc.), and so on.

In addition to the rules-based approach described in the foregoing, robot selection module 233 may select a robot using machine learning model trained to take various parameters as input, and to output one or more robots best suited to the task. The inputs may include available robots, their capabilities, their locations, their state of health, their availability, mission parameters, scheduling parameters, map information, and/or any other mentioned attributes of robots and/or missions. The outputs may include an identification of one or more robots to be used (or suitable to be used) to execute a mission. Robot selection module 233 may automatically select one or more of the identified robots for executing a mission, or may prompt a user of operator device 110 to select from the identified one or more robots (e.g., by showing the recommended robots in a user interface map, such as that described below with reference to FIGS. 6-8).

Robot instruction module 234 transmits instructions to the selected one or more robots to manipulate the object(s) in the source area (e.g., to ultimately transport the object(s) to the destination area). In an embodiment, robot instruction module 234 includes detailed step-by-step instructions on how to transport the objects. In another embodiment, robot instruction module 234 transmits a general instruction to transmit one or more objects from the source area to the destination area, leaving the manner in which the objects will be manipulated and ultimately transmitted up to the robot to determine autonomously.

Environment map database 240 includes one or more maps representative of the facility. The maps may be two-dimensional, three dimensional, or a combination of both. Central communication facility 130 may receive a map from operator device 110, or may generate one based on input received from one or more robots 140 (e.g., by stitching together images and/or depth information received from the robots as they traverse the facility, and optionally stitching in semantic, instance, and/or other sensor-derived information into corresponding portions of the map).

Regardless of how maps are generated, environment map database 240 may be updated by central communication facility 130 based on information received from operator device 110 and/or from the robots 140. Information may include images, depth information, auxiliary information, semantic information, instance information, and any other information described herein. The maps may include information about objects within the facility, obstacles within the facility, and auxiliary information describing activity in the facility. Auxiliary information may include traffic information (e.g., a rate at which humans and/or robots access a given path or area within the facility), information about the robots within the facility (e.g., capability, location, etc.), time-of-day information (e.g., traffic as it is expected during different segments of the day), and so on.

In an embodiment, the maps may include semantic and/or instance information. The semantic information may identify classes of objects within the maps. For example, the map may show, that for a given object, the object is of a given class, such as "pallet", "obstacle," "human," "robot," "pallet stand," and so on. The instance information may indicate the boundaries of each object. For example, a semantic map alone may not be usable by a robot to distinguish the boundary between two adjacent pallets that are abutting one another, as every pixel observed by the robot and representative of the pallets would be classified in an identical manner. However, with instance information, the robot is able to identify and distinguish different pallets from one another. The instance information may, in addition to indicating boundaries, indicate identifiers of individual objects (e.g., through a taxonomy scheme, the system may assign identifiers to different objects, such as P1, P2, P3 for successively identified pallets). Semantic information may be populated into the map where a semantic segmentation algorithm executed either by a robot, or by central communication facility 130 (in processing raw image data transmitted from the robot to the central communication facility) recognizes an object in space (e.g., using instance information to delineate object boundaries as necessary). Semantic information may additionally, or alternatively, be imported into the map where a human operator of operator device 110 indicates, using a user interface, that an object is positioned at a particular location on the map.

Central communication facility 130 may continuously update the maps as such information is received (e.g., to show a change in traffic patterns on a given path). Central communication facility 130 may also update maps responsive to input received from operator device 110 (e.g., manually inputting an indication of a change in traffic pattern, an area where humans and/or robots are prohibited, an indication of a new obstacle, and so on).

Maps may be viewable to an operator by way of a user interface displayed on operator device 110. Information within the maps may be visible to the operator. For example, segment and instance information for any given object, robot, or obstacle represented in the map may be visible. Moreover, representations of auxiliary information may be overlaid into the map. For example, a type of auxiliary information may be selected by a user (e.g., by selecting a selectable option corresponding to the type from within the user interface). The user interface may output a heat map representation of the auxiliary information. As an example, the heat map may represent human traffic (e.g., frequency or density of human beings in a given location). The user interface may enable a user to select a time, or a length of time, at which to view the heat map. This may be useful, for example, to determine human activity throughout different parts of a facility at different times and on different days. This information may be usable by robots as well to make autonomous routing decisions to, e.g., avoid areas where human traffic is frequent.

Exemplary Autonomous Mobile Robot Configuration

Figure 3:
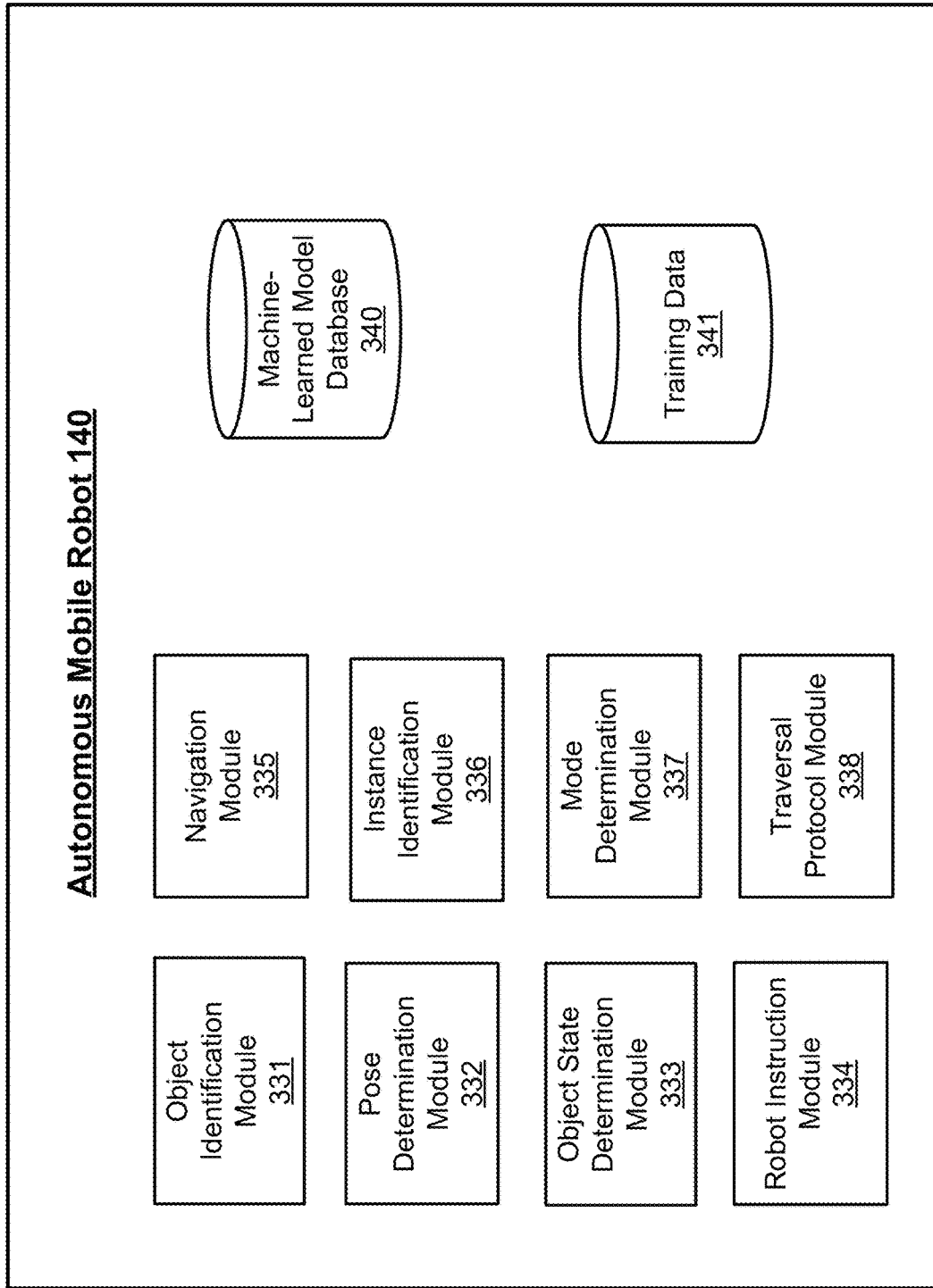
FIG. 3 illustrates one embodiment of exemplary modules and data stores used by the autonomous mobile robot.

FIG. 3 illustrates one embodiment of exemplary modules and data stores used by the autonomous mobile robot. As depicted in FIG. 3, autonomous mobile robot 140 includes object identification module 331, pose determination module 332, object state determination module 333, robot instruction module 334, navigation module 335, instance identification module 336, mode determination module 337, traversal protocol module 338, machine-learned model database 340, and training data database 341. The modules and databases depicted in FIG. 3 are merely exemplary; fewer or more modules and/or databases may be used to achieve the functionality described herein.

Object identification module 331 ingests information received from sensors of robot 140, and outputs information that identifies an object in proximity to the robot. The sensors may include one or more cameras, one or more depth sensors, one or more scan sensors (e.g., RFID), a location sensor (e.g., showing location of the robot within the facility and/or GPS coordinates), and so on. Object identification module 331 may utilize information from a map of the facility (e.g., as retrieved from document map database 240) in addition to information from robot sensors in identifying the object. For example, object identification module 331 may utilize location information, semantic information, instance information, and so on to identify the object.

In an embodiment, object identification module 331 queries a database with information derived from the sensors (e.g., dimension information, coloration, information derived from an RFID scan or a QR code, etc.), and receives in response to the query an identification of a matching object (if any object is found to be matching). In an embodiment, object identification module 331 inputs the information derived from the sensors into a machine-learned model (e.g., stored in machine-learned model database 240), and receives as output a probability that the information matches one or more candidate objects. Object identification module 331 determines, based on the probability exceeding a threshold for a given candidate object, that the candidate object is a detected object from the sensor information. An identifier of an object may specifically identify the object (e.g., where the object is a cinderblock, an identifier of which cinderblock it is, such as Cinderblock A14 where there are other cinderblocks A1-100, B1-100, etc.), and/or may identify one or more characteristics of the object (e.g., by type, such as pallet; by dimensions, such as 2×2 meters, by weight (e.g., as derived from auxiliary information of a map of maps database 240); and so on).

Pose determination module 332 determines a pose of a given object. The term pose, as used here, may refer to an orientation of an object and/or a location (including x, y, and z coordinates). The orientation may be absolute, or relative to another object to be manipulated and/or obstacle (e.g., a wall, a delivery truck, etc.). The pose may refer to an orientation of the object as a whole and/or sub-objects within the object (e.g., the orientation of a payload on top of a pallet, which may be offset from the pallet base itself). A pose of an object may affect the route a robot takes when approaching the object to manipulate the object.

Pose determination module 332 captures a red-green-blue (RGB) image of an object to be transported from a source to a destination (e.g., using a camera sensor of the robot when approaching the object). The use case of an RGB image is merely exemplary and used throughout for convenience. The image, wherever RGB is used herein, may instead be any other type of image, such as a grayscale image. Pose determination module 332 may also capture depth information representative of the object from a depth sensor of the autonomous robot (e.g., to determine dimensions of the object). Pose determination module 332 may use any other information described above with respect to object identification in order to determine pose.

In an embodiment, pose determination module 332 may generate a bounding box within the RGB image surrounding the object. While described below with reference to pose determination module 332, the bounding box may alternatively be generated by object identification module 331 and/or a single module that performs the activity of both of these modules. The bounding box may be a two-dimensional bounding box and/or a three-dimensional bounding box. A two-dimensional (2D) bounding box may be defined with, e.g., 2 or 3 features (e.g., corners or other keypoints) of an object. A three-dimensional (3D) bounding box includes at least 4 features to be extracted to generate the bounding box. In an embodiment, to generate a 3D bounding box, a 2D bounding box may first be extracted by applying a machine-learned model to the image. Pose determination module 332 may then search the image to identify additional features (e.g., further keypoints of a 3D box such as corners). The three-dimensional bounding box may include the 2D bounding box as connected to the one or more additional features. In an embodiment, a machine learned model may take the image as input, and may output a 3D bounding box without the aforementioned interstitial steps. The 3D bounding box may incorporate information about the object pose (e.g., where the machine learned model takes pose information as input). The bounding box may be generated using heuristics (e.g., by using computer vision to identify the boundaries of the object relative to other items within the RGB image), or may be generated using machine learning (e.g., by inputting the RGB image, optionally including the depth information, into a machine-learned model, and receiving as output a bounding box). The machine learning model may be a deep learning model, trained to pair images and depth information with bounding boxes.

Pose determination module 332 applies a machine-learned model (e.g., as obtained from machine-learned model database 340) to the RGB image and/or the bounding box. Optionally, depth information may be included as input to the machine-learned model. The machine-learned model is configured to identify features of the object based on one or more of the identified object type, the RGB image, and the depth information. The term feature as used herein may refer to a predefined portion of significance of an object, such as a keypoint of the object. Features may include, for example, corners, curves, or other expected features of candidate objects. As an example, a pallet may be expected to have 8 keypoints, the 8 keypoints corresponding to corners of the pallet. The machine learning model may additionally identify a type of the object, or may take the type of the object in as input based on output from object identification module 331, which may result in a more robust determination of features.

The machine-learned model may be trained using training data from training data database 341. Training data database may include labeled images, the labels of each image indicating at least one of one or more visible features and an object type. Based on an angle at which an image of an object is captured, some features may be obscured and/or occluded by other objects. For example, if an image of a pallet is captured at an angle that perfectly faces one side of the pallet, the pallet will appear to be a two-dimensional rectangle, and only four keypoints will be visible. If the pallet is captured at a rotated angle, however, then depending on the angle, six or seven corners (e.g., keypoints) may be visible. The training data may include examples of objects and their visible features from many different angles, to ensure that objects of new images can be identified regardless of how many keypoints are visible based on the angle of orientation used when images are captured. The labels may provide macro and/or micro categorizations of objects (e.g., pallet; large pallet; 2×3 meter pallet, etc.).

In an embodiment, prior to applying the machine-learned model to the RGB image, pose determination module 332 reduces the degrees of freedom of the object from six to four degrees of freedom by constraining the object to a horizontal position. This improves processing efficiency and accuracy of the machine learning model, in that a much smaller set of training data is needed to accurately fit the RGB image to the training data.

In an embodiment, the machine-learned model may be configured to output a respective confidence score for each respective identified feature. The confidence score may be derived from a probability curve reflecting how well the input data fits to the training data. Pose determination module 332 may compare comparing each respective confidence score to a threshold. Responsive to determining that a respective confidence score does not meet or exceed the threshold, pose determination module 332 may output a determination that its respective feature is not visible. In an embodiment, responsive to determining that no respective feature is visible, pose determination module 332 may determine that the three-dimensional pose is indeterminable. Alternatively, pose determination module 332 may require a threshold number of features to be visible, and may determine that the three-dimensional pose is indeterminable where greater than zero, but less than the threshold, number of features are determined to not be visible based on the confidence scores. Pose determination module 332 may, responsive to determining that the three-dimensional pose is indeterminable, transmit an alert that is caused to be received by operator device 110 (e.g., by way of direct transmission, or by way of transmitting information to central communication system 13, which in turn transmits the alert to operator device 110.

Having received an identification of features of the object, pose determination module 332 may determine which of the identified features of the object are visible to the autonomous robot, and may determine therefrom a three-dimensional pose of the object. For example, pose determination module 332 may query a database indicating the type of the object and the identified features, and may receive an indication of a pose that corresponds to the type and identified features (e.g., rotated 3 degrees from center). As another example, pose determination module 332 may input the features, optionally including dimension information (e.g., distances between each feature, depth of each feature, etc.) into a machine learning model, and may receive an indication of the pose as an output of the machine learning model.

Object state determination module 333 determines whether the three-dimensional pose corresponds to a valid state. States may be valid, or invalid. Valid states are states of an object where the object is considered manipulatable (e.g., the object is oriented in a position that can be approached; the object does not have any unsafe features, such as loose additional objects on top of it, and so on). Invalid states are states of an object where the object is not considered manipulatable (e.g., because manipulation of the object by the robot would be unsafe).

Robot instruction module 334 determines whether to output instructions to the robot to manipulate the object. In an embodiment, in response to determining that the three-dimensional pose corresponds to the valid state, robot instruction module 334 outputs instructions to the robot to manipulate the object. Where the object is not in a valid state, robot instruction module 334 may instruct the robot to analyze another object for manipulation and/or may cause an alert to be output to operator device 110 (e.g., by communicating the invalid state to central communication system 130, which may alert operator device 110). In an embodiment, object state determination module 333 may, periodically, or at some aperiodic time interval or responsive to some condition, again evaluate whether the three-dimensional pose corresponds to valid state. For example, multiple objects may be near one another, some in a valid state, and others in an invalid state. As valid state objects are manipulated, previously inaccessible sides of invalid state objects may be exposed. A potential condition for re-evaluating whether the three-dimensional pose corresponds to valid state may include object state determination module 333 determining that an object has been moved or a previously inaccessible side of an invalid object has been exposed. Object state determination module 333 may determine that manipulation with the previously unexposed side is possible, and may convert the state of the object to a valid state.

In an embodiment, when the object is in a valid state, robot instruction module 334 may determine a side of the object that is optimal for manipulation. The term optimal for manipulation may refer to, relative to each approachable side of an object, a side that can be approached for manipulation. More than one side may be determined to be optimal, should two sides be approachable. In order to determine which of multiple sides is to be approached, robot instruction module 334 may determine whether a side has a highest likelihood of success, offers an efficiency gain, is safer relative to human beings in the vicinity, and may compute improvements based on any other parameter or any combination of parameters. For example, the object may be blocked on one or more sides from manipulation, because other objects are abutting the object on those sides. As another example, approaching the object from a given side may result in a more efficient path to be taken from the source area to the destination area than approaching from a different side. Robot instruction module 334 may instruct the robot to manipulate the object from the determined side.

In an embodiment, robot instruction module 334 may revise its assessment on which side is optimal for manipulation based on an interaction with the object. For example, robot instruction module 334 may initially approach an object from the north, but, when lifting the object, may detect based on feedback from a weight sensor that the weight of the object is primarily distributed to the south. Robot instruction module 334 may disengage the object, and re-approach it from the south in such a scenario for manipulation.

Robot instruction module 334, after having selected an object and having approached the object and manipulated it for transfer to the destination area, may instruct the robot to transport the selected object through the facility from the source area to a destination area. The route may be selected and updated by the robot using navigation module 335, based on information derived from environment 240 and environment information determined by way of capturing and processing images along the route (e.g., encountering unexpected obstacles such as objects, human beings, etc.). Robot navigation module 335 may also consider information in a map (e.g., high human traffic areas) when determining the route.

After reaching the destination area, robot instruction module 334 may instruct the robot to unload the selected object at a location within the destination area in any manner described above based on information from central communication system 130, or based solely on an analysis of autonomous mobile robot 140. In an embodiment, autonomous mobile robot 140 may determine where to unload the object based on a first number of objects of the plurality of objects already unloaded within the destination area and based on a second number of objects of the plurality of objects yet to be unloaded within the destination area. For example, autonomous mobile robot 140 may unload initial objects far enough into the destination area to ensure that there is room for all subsequent objects to be unloaded.

Autonomous mobile robot 140 may determine that a number of objects to be unloaded within the destination is uncertain. This may occur due to occlusion, such as where some objects are visible, but other objects behind those objects are not visible. In such a scenario, autonomous mobile robot 140 may generate an inference of how many objects are to be unloaded. To generate the inference, autonomous mobile robot 140 may use a depth sensor, and based on the dimensions of visible objects, infer a count of how many more objects are behind the visible objects based on how deep the space is. In some embodiments, rather than depth sensor data, other data may be used to generate the inference (e.g., dimensions of a source area, assuming the source area is filled to a particular capacity, such as 75% or 100%). Autonomous mobile robot 140 may unload objects within the destination area in a manner that ensures that the inferred number of objects can be unloaded into the destination area. For example, autonomous mobile robot 140 may stack the objects, unload the objects from back-to-front, generate aisles, and so on in a manner that preserves space for the additional objects. Autonomous mobile robot 140 may update its inference as objects are unloaded. For example, where images taken after some occluding objects are transported from the source area to the destination area show large empty spaces where it was presumed another object was hidden, autonomous mobile robot 140 may subtract a number of objects that fit within those large empty spaces.

Instance identification module 336 determines instances when autonomous mobile robot 140 is approaching objects for manipulation. For example, autonomous mobile robot 140 may identify using sensors that it is approaching one or more objects of a certain class (e.g., by comparing the sensor information to a semantic map). Autonomous mobile robot 140 may access instance information (e.g., by querying environment map 240), and may therewith differentiate two or more abutting objects sharing a same class (e.g., two or more pallets). Autonomous mobile robot 140 may utilize this information when determining how to manipulate an object (e.g., by using boundary information to determine where to approach an object, such as by finding the center of a side of the object to approach). Instances may additionally, or alternatively, be determined based on empty space or other edges existing between objects, such that each separate instance is readily identify separate from each other instance.

Mode determination module 337 determines a mode of operation of the autonomous mobile robot 140. The term mode of operation (or "mode" alone as shorthand) as used herein may refer to a collection of parameters and/or constraints that restrict the operation of a robot to a subset of activities. In some modes (e.g., a normal operation mode), restrictions may be omitted, such that every functionality is available to a robot. As an example, in one mode of operation, a robot may be constrained to ensure that the robot keeps a berth of at least a minimum distance between itself and any obstacle, but may be allowed to travel at high speeds. In another mode of operation, the robot may be constrained by a smaller minimum distance between itself and obstacles, but given the lower margin for error because the robot is closer to obstacles, the robot may be required to travel below a threshold speed that is lower than it would be if the minimum distance were higher. Modes may be defined based on types of obstacles encountered as well; that is, parameters such as minimum distance may vary based on whether a robot versus a human versus a fixed inanimate obstacle is detected. These constraints and parameters are merely exemplary; modes may be programmed to define parameters and constraints in any manner.

As autonomous mobile robot 140 executes a mission, mode determination module 337 processes obstacles encountered by autonomous robot 140, and determines therefrom whether conditions corresponding to a mode change are encountered. In an embodiment, mode determination module 337 determines that a mission cannot be continued if a current mode is not changed to a different mode. For example, where a current mode requires a distance of three meters be maintained from a nearest obstacle, and where autonomous mobile robot 140 must pass through a narrow corridor where this minimum distance cannot be maintained to complete the mission, mode determination module 337 determines that the route cannot be continued. Responsively, mode determination module 337 determines whether there is a different mode that can be used that allows for passage through the narrow corridor (e.g., a mode where the minimum distance requirement is sufficiently reduced to a lower berth that accommodates the corridor width, and, e.g., to maintain safety, a maximum speed may also be reduced). Where such a mode is available, mode determination module 337 adopts this alternative mode and switches operation of autonomous mobile robot 140 to this alternative mode. Autonomous mobile robot 140 thereafter continues the route.

In an embodiment, mode determination module 337 may use a default mode (e.g., a mode having a high distance requirement and allowing for a high maximum speed) wherever possible. Following from the example above, mode determination module 337 may, in such an embodiment, determine when the narrow corridor is cleared, such that reverting to the default mode with the higher distance requirement is again feasible. Responsive to determining that the narrow corridor is cleared, mode determination module 337 may revert operation of autonomous mobile robot 140 back to the default mode.

Mode determination module 337 may determine modes in scenarios other than those where another obstacle or robot is approached. For example, mode determination module 337 may use sensors to determine whether any pre-determined entity (e.g., object, human being, obstacle, etc.) is within a large threshold distance. Mode determination module 337 may, responsive to determining that no such entity is within the threshold, determine that an even higher maximum speed may be used by the robot, given that the robot is not in danger of colliding with any prescribed entity. In an embodiment, the mode of the robot may require the robot to illuminate a light that draws a boundary around the robot. The light may represent a minimum separation that the robot must maintain between itself and a human being.

In some embodiments, due to constraints associated with a mode a robot may pause or stop operation. For example, if a robot cannot clear an obstacle because it is unable to stay at least a required threshold distance away, then the robot may cease operation (e.g., stop moving). Responsive to ceasing operation, the robot may cause an alert to be transmitted (e.g., to one or more of operator device 110 and central communication system 130). The alert may include a reason why the robot is stopped (e.g., cannot clear obstacle). The alert may also include a next step that the robot will take (e.g., will reverse course and try a different aisle if not given alternate instructions manually within a threshold period of time, such as five minutes). Central communication system 130 may automatically provide instructions to the robot based on information in the map (e.g., abort mission, where another robot can more efficiently take an alternate route; e.g., take alternate route, etc.). Operator device 110 may similarly issue an instruction to the robot (e.g., through manual interaction with the user interface) to modify its course.

Traversal protocol module 338 determines a traversal protocol to use as a robot progresses across a route. The term traversal protocol, as used herein, may refer to a protocol that dictates how a robot determines the route it should follow. Exemplary traversal protocols may include an autonomous mobile robot (AMR) protocol, an automated guided vehicle (AGV) protocol, and any other protocol. An AMR protocol allows a robot to determine its route from source to destination (or from hop to hop between the source and the destination) autonomously, making dynamic adjustments as conditions are encountered. For example, a robot may take input from a map, as well as sensory input such as obstacles the robot encounters, when traversing. The robot may alter the route to navigate around obstacles as needed.

An AGV protocol uses markers, where a robot traverses from source to destination along predefined routes selected based on the markers, where each marker, as it is encountered, dictates a next direction for the robot to take. The markers may be any tool that provides sensory input to the robot, such as QR codes, bar codes, RFID sensors, and so on which the robot is equipped to detect using corresponding sensors installed on the robot. The markers need not be physical markers, and instead may be logical markers (e.g., markers indicated in a map, where when a physical point in a facility is reached by the robot, the robot determines that it has reached a next marker). In an embodiment, a user of operator device 110 may define a path for the AGV through a map shown in the user interface. Central communication system 130 may update environment map 240 to indicate the logical markers indicated by the operator, and a next direction for the robot to take (or other activity to perform, such as stop, unload, speed up, etc.) when that logical marker is reached. The logical markers may be communicated to the robot(s), which, when encountering the position of a marker, take the indicated action. In order to localize itself with respect to the map, a robot may use sensors such as LIDAR, cameras, and the like to determine its position.

As a robot traverses along a route (e.g., using an AGV protocol), the robot captures sensory input (e.g., obstacles, markers indicating that a route should be changed, location information indicating that a certain part of the facility has been reached). Traversal protocol module 338 takes in information about the sensory input, and determines whether a condition is met that dictates that the protocol should be changed (e.g., from an AGV protocol to an AMR protocol, or vice versa). An exemplary condition includes detecting, during use of an AGV protocol, a marker indicating that a transition is to be performed to AMR navigation. Another exemplary condition includes detecting, during use of either protocol, that the robot has encountered a location associated with a transition to another protocol (e.g., based on image, input, other sensory input, location input relative to a map, and so on). Responsive to detecting such a condition, traversal protocol module 338 switches routing of the robot from its current protocol in use to another protocol (e.g., from AMR to AGV, or vice versa).

Figure 4:
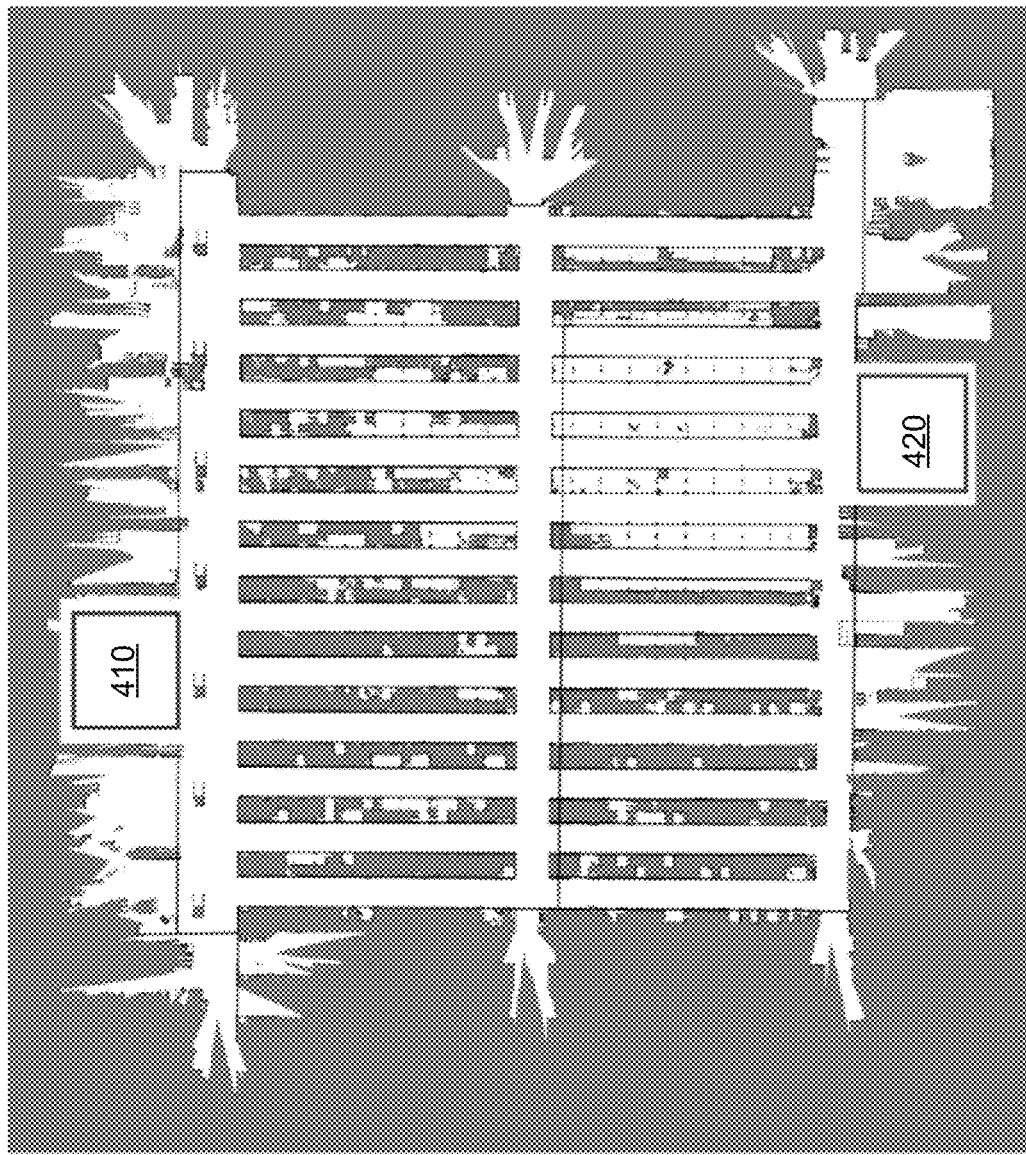
FIG. 4 illustrates one embodiment of an exemplary map of a facility showing areas within the facility.

FIG. 4 illustrates one embodiment of an exemplary map of a facility showing areas within the facility. As depicted, environment 400 includes source area 410 and destination area 420. The space between source area 410 and destination area 420 includes aisles surrounded of obstacles that cannot be traversed. Autonomous mobile robot 140 may determine which route to traverse (e.g., using navigation module 335) based on information in the map, including information about the location of the obstacles, traffic patterns in each aisle, heat map information corresponding to any form of data, such as human traffic, time of day, robot traffic, and the like. Autonomous mobile robot 140 may determine which route to traverse using additional sensory information, such as camera sensors that depict unexpected obstacles in a given aisle, efficiency information (e.g., a shortest route), and so on.

Exemplary Autonomous Mobile Robot Operation

In an exemplary use case, objects, such as pallets, may arrive at a facility. A source area may be selected in any manner described above (e.g., using source area module 231), the boundaries of which encompass the objects. An operator (e.g., operating operator device 110) may define a mission, where the objects are to be transported from the source area to a destination area. The destination area may be selected in any manner described above (e.g., using destination area module 232. For example, the operator may draw, on a graphical representation of the facility displayed on client device 110, the boundaries of the destination area, or may select a number of pallet stands to which pallets are to be dropped off. In an embodiment, more than one source area and/or more than one destination area may be defined.

After defining the mission, central communication system 130 may select and instruct one or more autonomous mobile robots 140 to execute the mission. To this end, autonomous mobile robot 140 may approach the objects and capture one or more RGB images of the objects. The RGB images may be used to determine pose of the objects, and to determine other attributes of the objects (e.g., a count of the objects, a type of the objects, a volume of the objects, and so on). After evaluating the objects, autonomous mobile robot 140 may determine an order in which to manipulate the objects based on their pose, based on objects that obstruct the robot's ability to approach other objects, and any other factor described herein.

Autonomous mobile robot 140 may then approach and manipulate objects in any manner described herein that enables the objects to be transported to the destination area. Autonomous mobile robot 140 may determine a route from the source area to the destination area in any manner described above (e.g., without input from central communication system 130). Movement speed may be adjusted based on information associated with the object (e.g., weight, fragility, etc.). Autonomous mobile robot 140, when approaching the destination area, may determine how to unload the object based on mission information, such as ensuring that objects are unloaded in a manner that allows the destination area to still accommodate all remaining objects. For example, autonomous mobile robot 140 may fill a destination area from back-to-front. Autonomous mobile robot 140 may input mission information and destination area information into a machine learning model, and receive as output a plan for unloading objects in the destination area. Autonomous mobile robot 140 may use a default plan for unloading objects in the destination area. In an embodiment, autonomous mobile robot 140 may determine that the destination area is not suitable to accommodate the mission, and may alter the destination area (e.g., by causing obstacles to be moved), add space to the defined destination area, or alert the operator to do the same.

Autonomous mobile robot 140 may cause the mission parameters to be updated as the mission continues. For example, autonomous mobile robot 140 may have initially mis-counted an amount of objects to be transported as part of the mission due to some objects occluding other objects, where the occluded objects are revealed as non-occluded objects are manipulated. This example would cause autonomous mobile robot 140 to adjust the count of objects, which may in turn cause other mission parameters to be adjusted (e.g., destination area size, order of transporting objects, etc.).

Computing Machine Architecture

Figure 5:
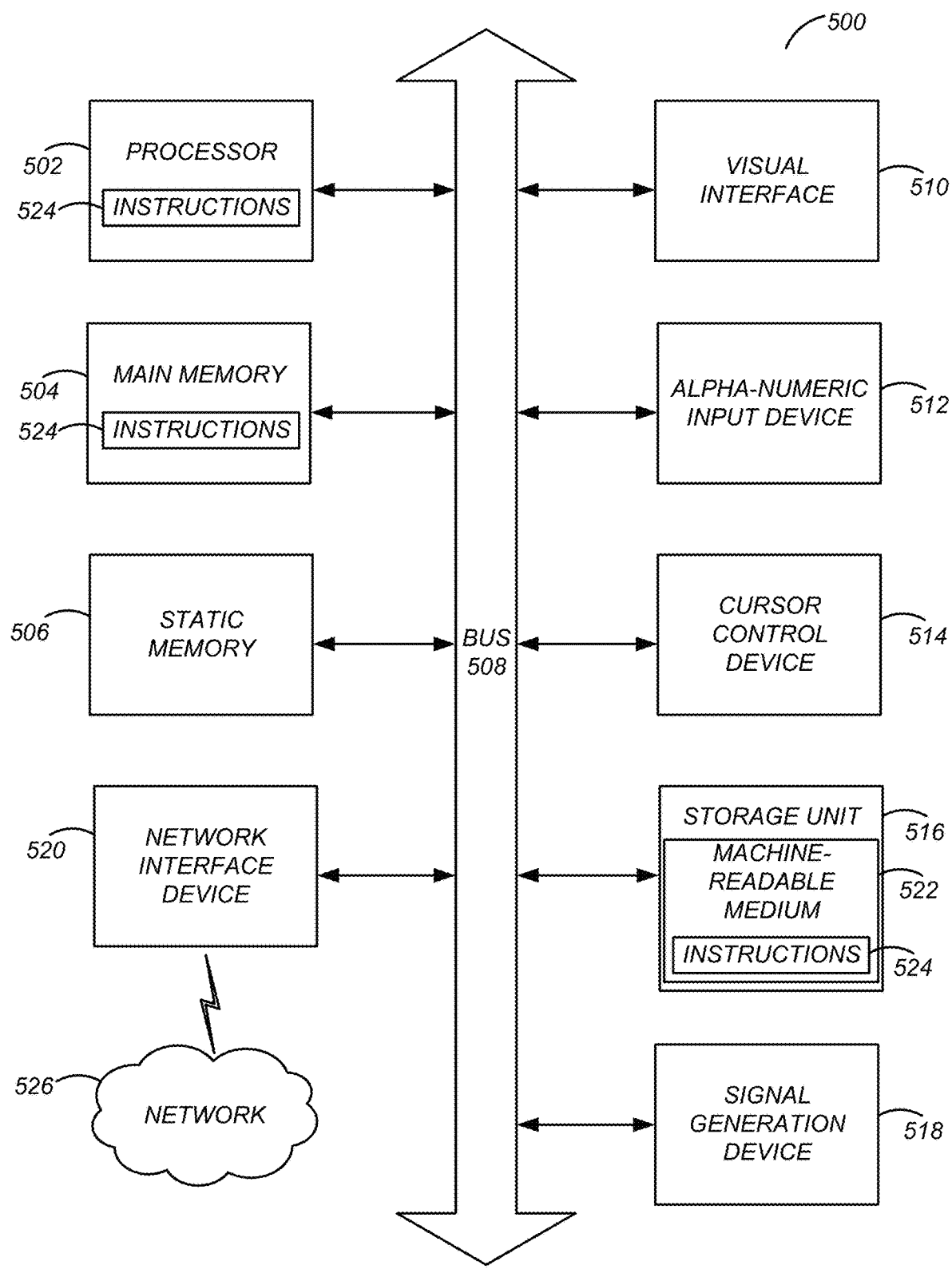
FIG. 5 is a block diagram illustrating components of an example machine able to read instructions from a machine-readable medium and execute them in a processor (or controller).

FIG. (FIG. 5 is a block diagram illustrating components of an example machine able to read instructions from a machine-readable medium and execute them in a processor (or controller). Specifically, FIG. 5 shows a diagrammatic representation of a machine in the example form of a computer system 500 within which program code (e.g., software) for causing the machine to perform any one or more of the methodologies discussed herein may be executed. The program code may be comprised of instructions 524 executable by one or more processors 502. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes a processor 502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 504, and a static memory 506, which are configured to communicate with each other via a bus 508. The computer system 500 may further include visual display interface 510. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 510 may include or may interface with a touch enabled screen. The computer system 500 may also include alphanumeric input device 512 (e.g., a keyboard or touch screen keyboard), a cursor control device 514 (e.g., a mouse, a trackball, a joystick, a motion sensor, or other pointing instrument), a storage unit 516, a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software) may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

Exemplary User Interface Features

Figure 6:
FIG. 6 illustrates one embodiment of an exemplary user interface enabling selection and manipulation of entities within the facility.

FIG. 6 illustrates one embodiment of an exemplary user interface enabling selection and manipulation of entities within the facility. User interface 600 depicts a map of the facility. User interface 600 may be generated for display to an operator by way of operator device 110. User interface 600 may be generated by central communication system 130, an application installed on operator device 110, or a combination thereof. The map within user interface 600 may be updated as feedback is received from one or more robots by central communication system 130 in any manner described herein. The map may be any form of map described herein (e.g., semantic map, instance map, etc.). The map may be two-dimensional or three-dimensional, and where the map is three-dimensional, two-dimensional slices may be viewed based on information from the three-dimensional map. Icons in user interface 600 connotate entities that are placed within the facility at a location corresponding to the position of the icon within the map. Icon 610 corresponds to a pallet stand, icon 620 corresponds to a designated location for a robot to park, icon 630 corresponds to a robot, and so on. Icons may correspond to any form of entity, such as a human being, an obstacle, a path, a source area, a destination area, any number of robots, etc. The icons depicted in user interface 600 are merely illustrative and are non-limiting.

Figure 7:
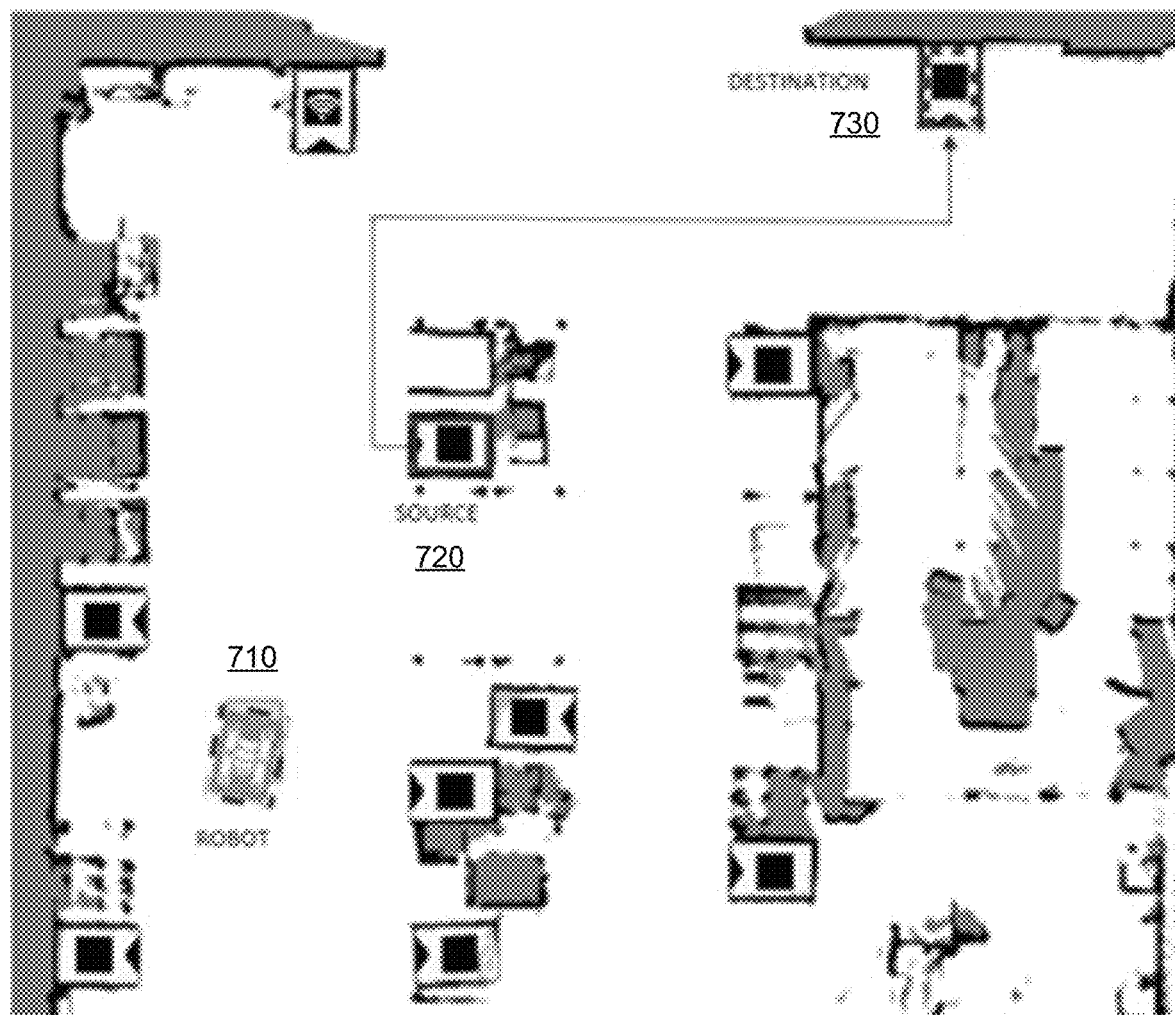
FIG. 7 illustrates one embodiment of an exemplary user interface showing selections of entities within the facility.

FIG. 7 illustrates one embodiment of an exemplary user interface showing selections of entities within the facility. User interface 700 shows robot icon 710, source icon 720, and destination icon 730, each of which are selected by a user. User interface 700 may be derived from user interface 600, where selected icons are visually distinguished relative to non-selected icons (e.g., through coloration, highlighting, and so on). Icon selections may be made in any manner (e.g., a mouse click while hovering a cursor over an icon; a tap over an icon using a touch screen, and so on).

In an embodiment, a user may configure a mission by interacting with user interface 700. In the exemplary embodiment depicted in FIG. 7, the user may select a robot corresponding to robot icon 710 for performing the mission. While a selection of a single robot is shown, the user may select more than one robot to perform the mission (e.g., by selection of multiple icons, or where a single icon represents multiple robots). The user may select source icon 720. Source icon 720 may be a single object or may include multiple objects. Where it includes multiple objects, the multiple objects may be individually selected by the user, or may be selected as part of a source area defined by the user, where the user draws the source area onto the map as described above. Destination icon 730 corresponds to a destination area that may be defined in any manner described with respect to source icon 720. The user may define areas without regard to whether they are source areas or destination areas. Central communication system 130 receives user selections and processes them accordingly. Semantic information of any kind may be shown within the user interface for display within the map. When viewing the map, an operator may add semantic information by interacting with the user interface to indicate that an object is at a particular location within space.

In order to establish a mission where a robot is to transport one or more objects from a source to a destination, the user may perform a drag-and-drop motion from source icon 720 to destination icon 730. Such drag-and-drop motion is detected (e.g., by the application and/or central communication system 130), and responsively, the mission is defined to have the selected robot transport the object from the source to the destination. The selected robot thereafter carries out the mission consistent with the manners described above. By way of the selections and gestures made with respect to user interface 700, an improved user interface for defining missions is created, in that users need not navigate cumbersome lists of parameters that may be inefficient to navigate and difficult to understand. Rather, the on-map selections and drag-and-drop mechanism enables the user to seamlessly define the mission. Drag-and-drop is merely exemplary; other interactions and gestures may be used to define a mission. For example, rather than dragging-and-dropping the source icon to the destination icon, the user may select each of the source and destination and select a button that indicates to the system that the source and destination are associated.

The user may use user interface 600 to define any mission parameter. For example, the user need not select a particular robot, and may merely select a source and destination, where central communication system 130 may select robots to perform the mission consistent with manners described herein. The user may select multiple sources and/or destinations from and to which objects are to be transported. In an embodiment, responsive to detecting selection of a source, the system may identify one or more candidate destination areas that would be more efficient to use (e.g., based on proximity to the source, based on traffic frequency of robots along possible paths to be used to transport the objects, based on obstacles indicated on the map, based on free space in the destination areas relative to the obstacles to be transported, based on a frequency with which candidate destination area is used, and so on, where a combination of these factors may be considered), and may visually distinguish those candidate destination areas from other possible destination areas in order to recommend those candidate destination areas to the user. The identification may be performed using heuristics, or by inputting these factors into a machine learning model, and deriving the identification from the output of the machine learning model.

The system may receive a selection of one or more points on the map through which a robot must pass when performing the mission, which may cause central communication system 130 to command the robot to pass through that point when performing the mission (and may cause a recommended destination area to be altered). The constraint that the robot must pass through the one or more points may be a hard constraint, or a soft constraint. Where this constraint is a soft constraint, the robot may determine whether following the constraint is possible (e.g., due to an obstacle or other scenario where the robot cannot pass through the one or more points based on its operating mode). Where following the soft constraint is not possible, the robot may navigate around the obstacle or other blocking feature, and then continue its mission, rather than waiting for the obstacle to move so that the robot passes through the indicated point. In an embodiment, the system may recommend points through which a robot is to pass, including one or more alternative routes.

Dragging and dropping, or other selections that cause the same effect, are described with respect to source, destination, and robots for ease of convenience. However, missions may be defined using drag-and-drop operations (or similar selections) of any semantic objects (e.g., further defined by instance information) as represented on a user interface map. For example, individual objects that are to be manipulated by a robot may be selected, persons may be selected, obstacles may be selected, markers may be selected, and so on, for a robot to interact with in any specified manner by way of a drag-and-drop operation.

Figure 8:
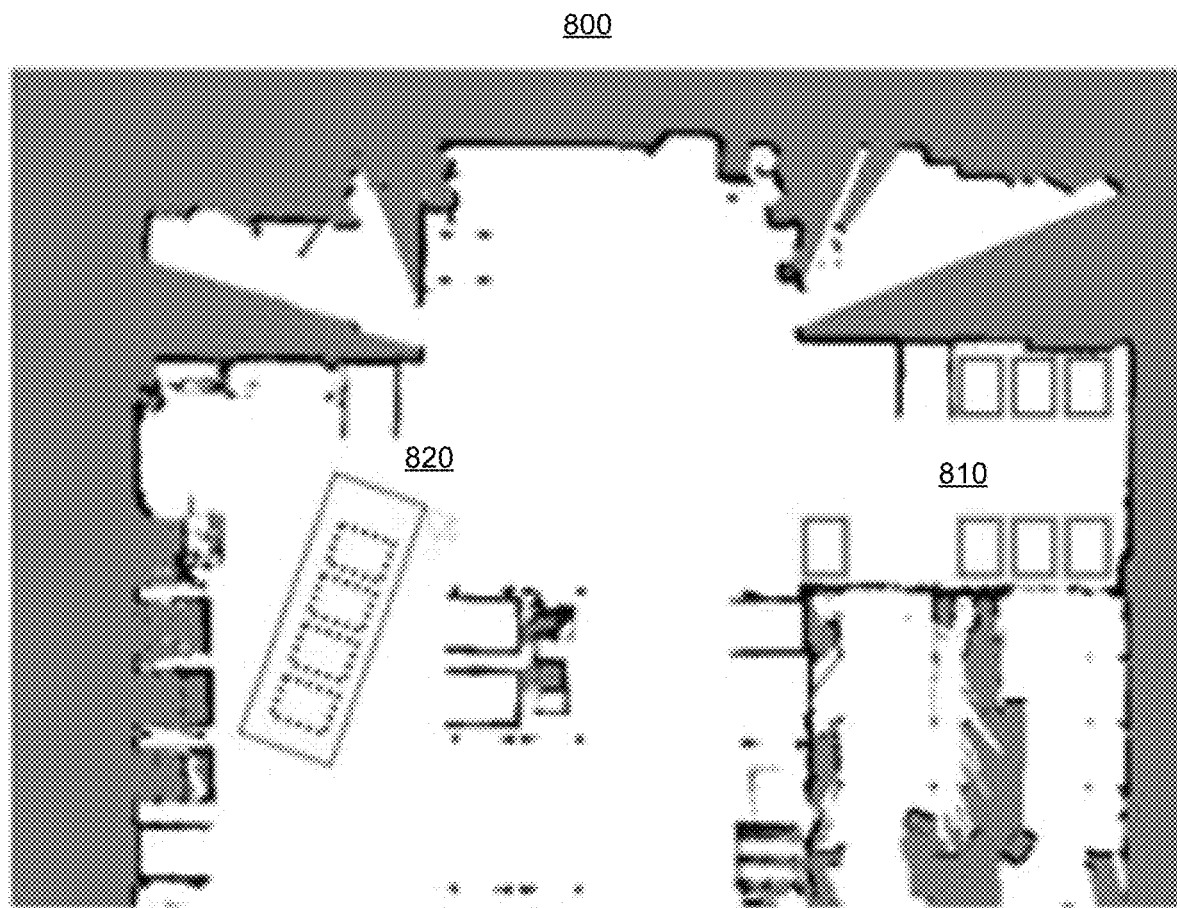
FIG. 8 illustrates one embodiment of an exemplary user interface showing an adjustment of a manner of placement of selected objects at a destination area.

FIG. 8 illustrates one embodiment of an exemplary user interface showing an adjustment of a manner of placement of selected objects at a destination area. User interface 800 is derived from user interface 600 and/or 700 and operates in similar manners to that described above. As depicted in user interface 800, objects 810 are to be transported to destination area 820, as part of a mission defined by a user in a manner consistent with usage of user interface 700. User interface 800 demonstrates control by the user of the particular manner in which the objects are dropped off within destination area 820. As shown, the user may select a desired orientation of one or more objects after they are unloaded from a robot. As depicted, the user may drag a corner of the destination area (or alternatively, one or more individual objects) and may rotate the objects or area to a desired angle. Any other manipulation may be performed as well (e.g., adjust angle of rotation, exact placement site within destination area 820, and so on. The system updates the mission based on these inputs, such that the robot unloads objects in the manner instructed by the user by use of user interface 800.

Figure 9A:
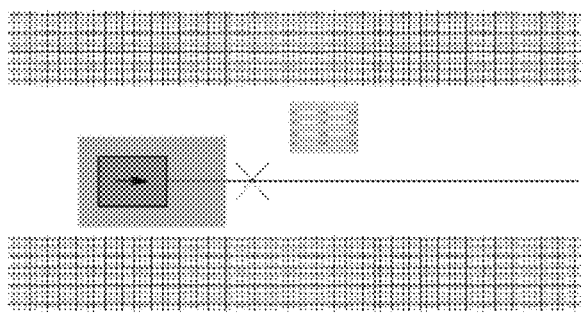
FIGS. 9A-9D illustrate exemplary embodiments of different modes of operations of robots, in accordance with one embodiment.
Figure 9B:
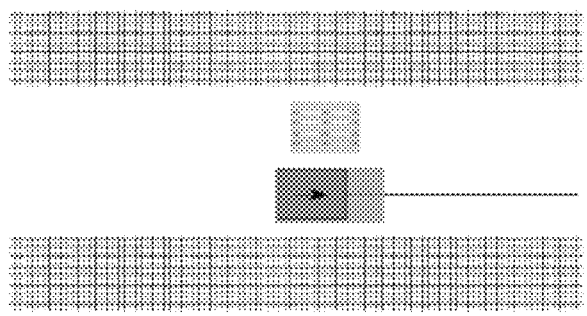

FIGS. 9A-9D illustrate exemplary embodiments of different modes of operations of robots. As depicted in FIG. 9A, a robot is shown on the left (the box with an arrow in it), surrounded by an area representing the minimum distance the robot must maintain from an obstacle, the minimum distance being based on its present operating mode (e.g., default mode). Also shown in FIG. 9A is a route (the drawn line), and an obstacle. The robot cannot complete its route while in the default mode because the obstacle would be at least partially within the minimum distance if the robot were to try to pass the obstacle along the route. As depicted in FIG. 9B, the robot determines that the route cannot be completed in a current operating mode (e.g., using mode determination module 337), and the robot switches its operating mode to a different operating mode (e.g., having a smaller minimum distance, and optionally having a lower maximum speed). The robot is able to pass the obstacle and continue along the route by switching to this operating mode.

Figure 9C:
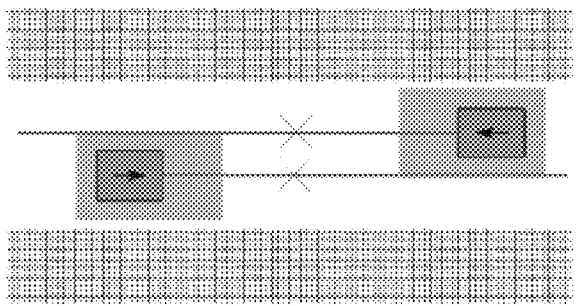
Figure 9D:
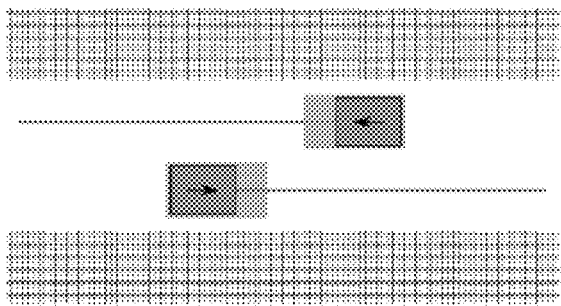

FIG. 9C depicts two robots that are each traversing their respective routes, and also depicts their respective safety zones (that is, minimum boundaries they must maintain from obstacles). Because of the nearness of the two routes, the robots both cannot continue their routes, as they would each enter the other's safety zone when passing one another. As shown in FIG. 9D, each robot's respective mode determination module 337 determines this condition, and respectively identifies a mode to switch to that reduces the minimum boundary size (e.g., and also reduces maximum speed) such that the robots may pass one another while complying with the constraints of their mode. This enables the two robots to each continue their paths without intervention by a human.

Figure 10:
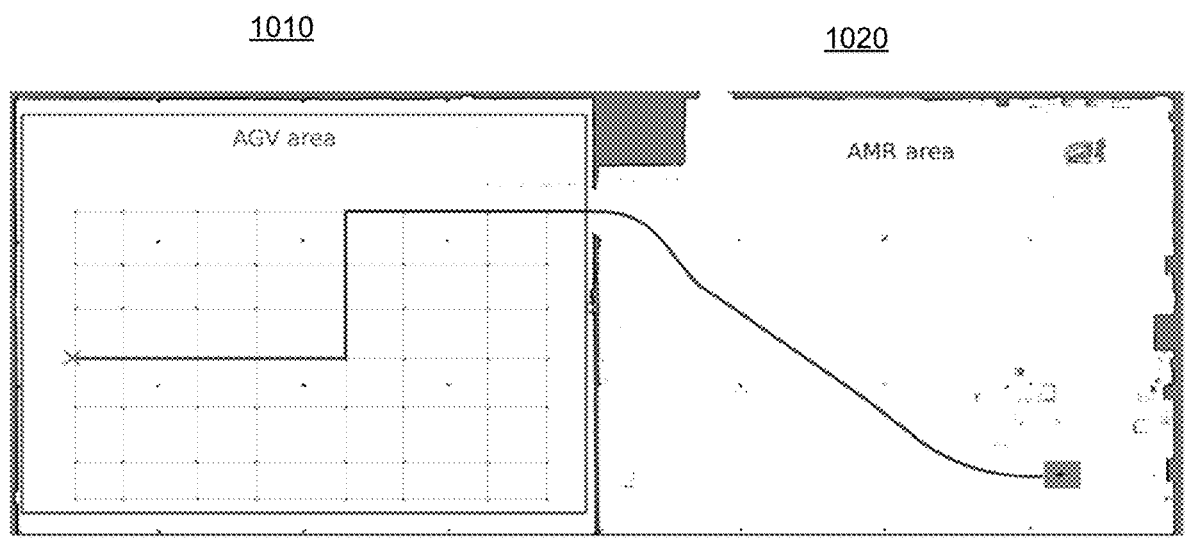
FIG. 10 illustrates an exemplary switch between traversal protocols by a robot traversing the facility, in accordance with one embodiment.

FIG. 10 illustrates an exemplary switch between traversal protocols by a robot traversing the facility. FIG. 10 indicates a route taken by a robot across a facility. The robot begins in AMR area 1020, where an AMR protocol is used to navigate the route taken by the robot from source to destination. When the robot enters AGV area 1010, traversal protocol module 338 determines a condition has been met that dictates that the robot should switch from using an AMR protocol to using an AGV protocol. The robot switches to the AGV protocol and follows a route (as drawn, a grid route) indicated by markers (e.g., physical or virtual markers) that each, as they are encountered, indicate to the robot which direction to travel, until a final marker is reached that indicates to the robot that the robot has reached its destination. While only two areas are depicted in FIG. 10, this is merely exemplary; any number of transitions between protocols may be taken when traversing a route depending on encountered conditions.

Figure 11A:
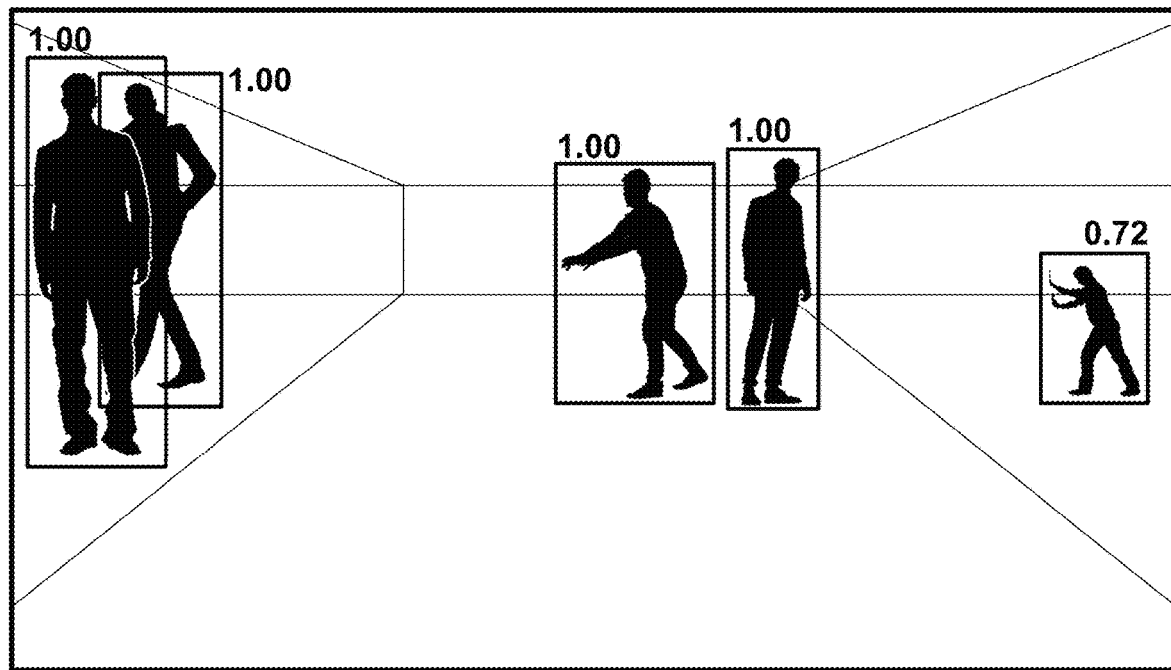
FIGS. 11A and 11B depict an example of instance detection and segmentation of a person, in accordance with one embodiment.
Figure 11B:
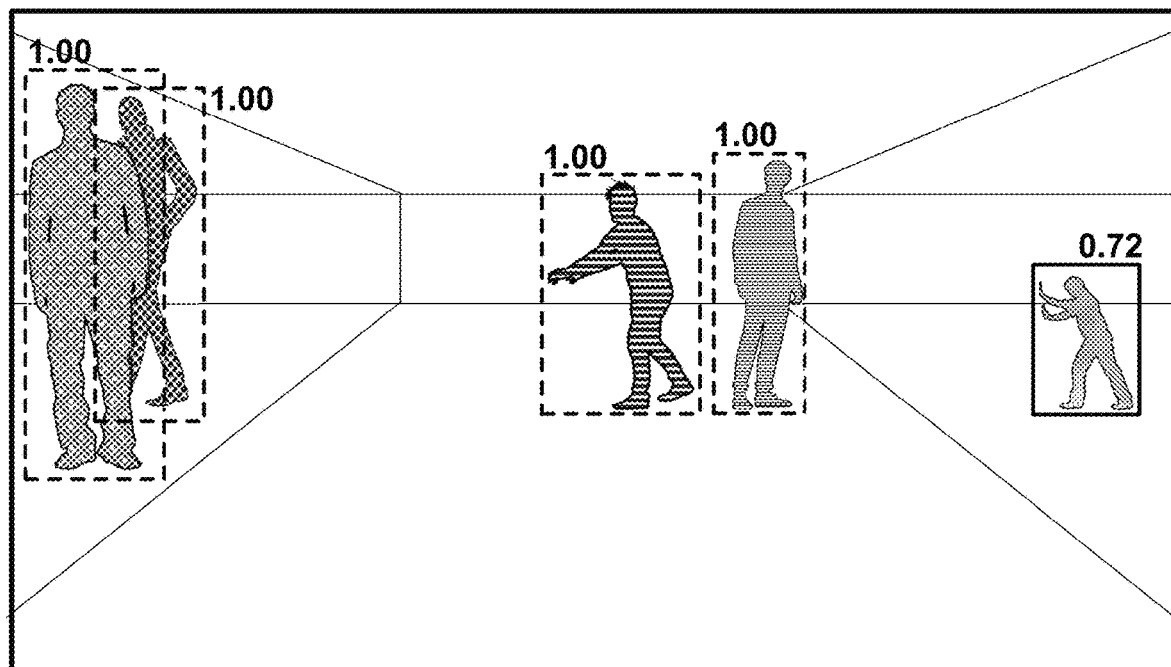

FIGS. 11A and 11B depict an example of instance detection and segmentation of a person. As depicted in FIG. 11A, a robot captures an image and applies bounding boxes around persons. Persons who abut one another are distinguished using instance information. Different instances of persons are determined in the manners described in the foregoing. As depicted in FIG. 11A, different instances of persons are depicted using different shading and borders. Thus, the boundary of the left-most depicted person is distinguished from the boundary of the next left-most depicted person, and these persons can be distinguished from one another notwithstanding their images abutting one another.

Figure 12A:
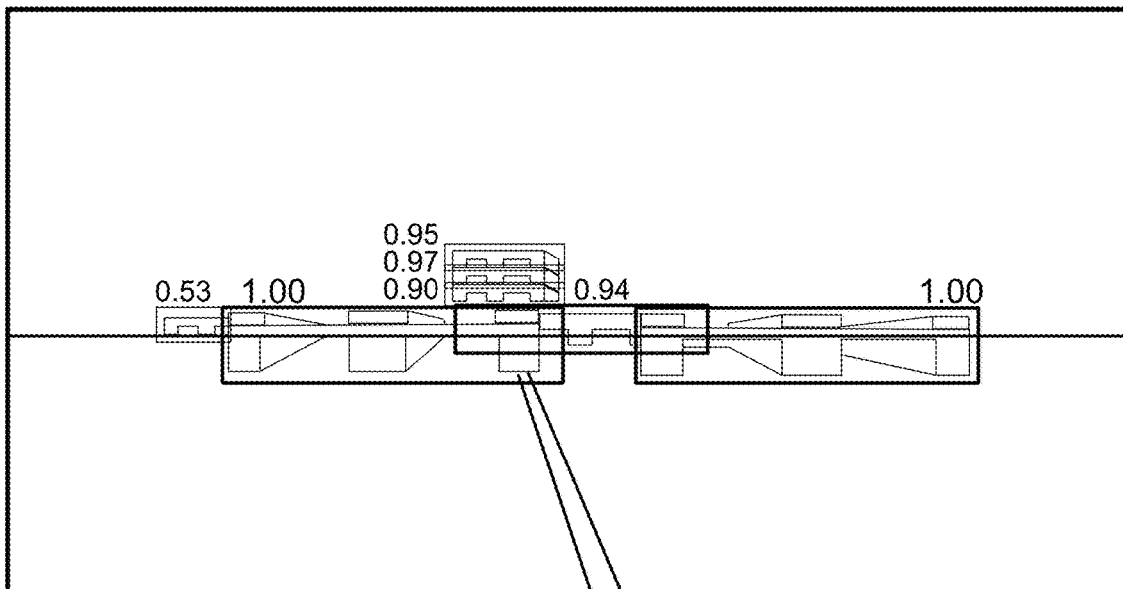
FIGS. 12A and 12B depict an example of instance detection and segmentation of various pallets, in accordance with one embodiment.
Figure 12B:
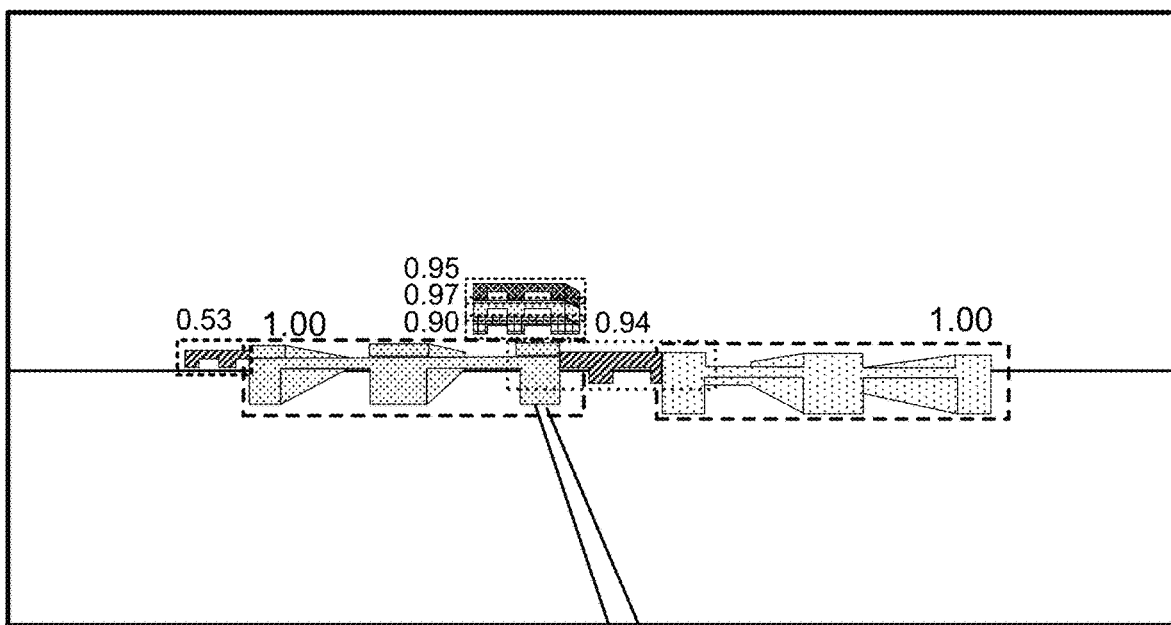

FIGS. 12A and 12B depict an example of instance detection and segmentation of various pallets. As depicted in FIG. 12A, a robot captures an image and applies bounding boxes around pallets. This is merely exemplary, and where pallets are described with reference to FIGS. 12A and 12B, any object may be substituted. Pallets that abut one another are distinguished using instance information. Different instances of pallets are determined in the manners described in the foregoing. As depicted in FIG. 12B, different instances of pallets are depicted using different shading and borders. Thus, the boundaries of adjacent and stacked pallets are distinguished from one another notwithstanding their images abutting one another.

Figure 13:
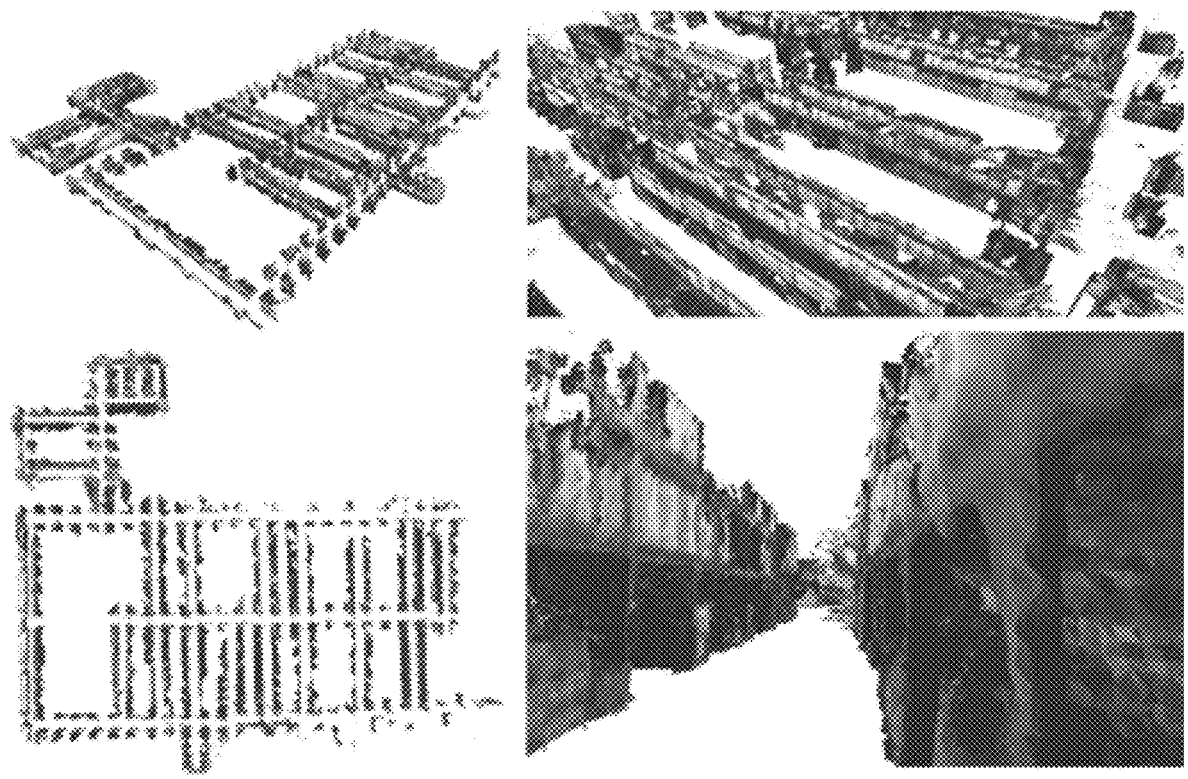
FIG. 13 depicts multiple views of an exemplary three-dimensional map, in accordance with one embodiment.

FIG. 13 depicts multiple views of an exemplary three-dimensional map. As shown in FIG. 13, a three-dimensional facility of a map is viewable by a user through a user interface. The user may manipulate the map to view the map from a two-dimensional orientation (e.g., top-down, as shown in the bottom-left). The user may zoom into different portions of the map to view semantic and instance information about objects and obstacles in the facility more closely. The three-dimensional map may be used to define missions and input semantic information in any manner described in the foregoing.

FIG. 14 depicts an illustrative flowchart of a process for causing a robot to execute a mission, in accordance with one embodiment. Process 1400 begins with a central communication system (e.g., central communication system 130) identifying 1402 a source area within a facility (e.g., source area 410) comprising a plurality of objects, the source area defined by a source boundary. The source area may be identified using source area module 231. The central communication system determines 1404 a destination area (e.g., destination area 420) within the facility to which the plurality of objects are to be transported and unloaded, the destination area defined by a destination boundary. The destination area may be determined using destination area module 232. The source boundary and destination boundary may be defined based on user input into a map displayed to a human operator. In an embodiment, the destination area is selected from a plurality of candidate destination areas, where a candidate area is selected based on its boundary being large enough to accommodate a volume of the plurality of objects.

In an embodiment, the destination area includes a plurality of points (e.g., distinct pallet stands on which pallets can be unloaded). The central communication system receives sensory input from one or more of the selected robots of the destination area, that includes one or more of one or more images. The central communication system identifies, based on the one or more images, a plurality of candidate drop-off points for the selected object, and determines, from the candidate drop-off points, an optimal drop-off point for the selected object. For example, the candidate drop-off points may be pallets that are unoccupied, and optionally, that satisfy other parameters (e.g., are nearest to the robot, do not have objects between the pallets and the robot, etc.). The central communication system may determine whether using the closest point to drop off the selected object would block one or more other ones of the plurality of candidate drop-off points, and may assign the closest point as the optimal drop-off point responsive to determining that using the closest point to drop off the selected object would not block one or more other ones of the plurality of drop-off points.

The central communication system selects 1406 one or more robots (e.g., robot 140) of a fleet of robots within the facility based on one or more of a capability of the robots and a location of the robots within the facility. The selection may be performed using robot selection module 233. The central communication provides 1408 an instruction to each selected robot to transport the plurality of objects from the source area to the destination area (e.g., using robot instruction module 234). Each robot is configured to autonomously select an object of the plurality of objects based on a position and location of the object within the source area, transport the selected object through the facility from the source area to a destination area along a route selected by the robot, and unload the selected object at a location within the destination area. Optionally, the location within the destination area is selected based on a first number of objects of the plurality of objects already unloaded within the destination area and based on a second number of objects of the plurality of objects yet to be unloaded within the destination area. In an embodiment, the one or more robots unload objects at least a threshold distance from the destination boundary. After transporting the selected object to the destination, a robot may capture an image of the source area. The robot or the central communication system may use the image to identify an object that was previously occluded by the selected object, and adjust the second number of objects based on identifying the previously occluded object.

FIG. 15 depicts an illustrative flowchart of a process for a robot to determine a three-dimensional pose of an object, in accordance with one embodiment. Process 1500 begins with an autonomous robot (e.g., autonomous mobile robot 140) capturing 1502 an image of an object to be transported from a source to a destination. The image may be a red-green-blue (RGB) image or a grayscale image, or any other image (e.g., infrared, ultraviolet, x-ray, or any combination thereof). The autonomous robot generates 1504 a bounding box within the image surrounding the object. The autonomous robot applies 1506 a machine-learned model (e.g., selected from machine learning model database 340) to the image with the bounding box, the machine-learned model configured to identify an object type of the object, and to identify features of the object based on the identified object type and the image. The machine learned model may be trained using labeled images (e.g., located in training data database 341), the labels of each image indicating at least one of one or more visible features and an object type. In an embodiment, the autonomous robot may capture depth information representative of the object from a depth sensor of the autonomous robot, where the depth information is input into the machine-learned model to identify the features of the object.

In an embodiment, prior to applying the machine-learned model to the image, the autonomous robot reduces the degrees of freedom of the object from six to four degrees of freedom by constraining the object to a horizontal position (e.g., obscuring all corners of a rectangular pallet other than four corners that would be visible in a two-dimensional plane where one side of the pallet is viewed head-on). The autonomous robot determines 1508 which of the identified features of the object are visible to the autonomous robot. The machine-learned model may output a respective confidence score for each respective identified feature.

In such an embodiment, the autonomous robot may determine which of the identified features of the object are visible to the autonomous robot by comparing each respective confidence score to a threshold, and responsive to determining that a respective confidence score does not meet or exceed the threshold, determining that its respective feature is not visible. Where the autonomous robot determines that no respective feature is visible, the autonomous robot may determine that the three-dimensional pose is indeterminable. Optionally, where the three-dimensional pose is indeterminable, the autonomous robot may alert a human operator.

The autonomous robot determines 1510 a three-dimensional pose of the object (e.g., using pose determination module 332) based on the features determined to be visible to the autonomous robot. In an embodiment, the autonomous robot determines (e.g., using object state determination module 333) whether the three-dimensional pose corresponds to a valid state, and, in response to determining that the three-dimensional pose corresponds to the valid state, the autonomous robot manipulates the object. The autonomous robot may determine a side of the object that is optimal for manipulation, and may manipulate the object from the determined side (e.g., using robot instruction module 334). In an embodiment, the autonomous robot may lift, by the autonomous mobile robot, the object, from a side of the object that is selected based on the determined three-dimensional pose, and may transport the object to the destination (e.g., from source area 410 to destination area 420).

FIG. 16 depicts an illustrative flowchart of a process for using an improved user interface to establish a mission, in accordance with one embodiment. Process 1600 begins with an application (e.g., of operator device 110) or a central communication system (e.g., central communication system 130) generating for display 1602 to a remote operator a user interface comprising a map (e.g., retrieved from environment map database 240), the map comprising visual representations of a source area (e.g., source area 410), a plurality of candidate robots (e.g., including autonomous mobile robot 140), and a plurality of candidate destination areas (e.g., including destination area 420).

The application or central communication system receives 1604, via the user interface, a selection of a visual representation of a candidate robot of the plurality of candidate robots (e.g., robot icon 710). In an embodiment, the visual representation of the candidate robot corresponds to a plurality of robots, and mission comprises selecting one or more robots of the plurality of robots to execute the mission based on the drag-and-drop gesture. In such an embodiment, responsive to receiving the visual selection of the candidate robot, the application or central communications system may identify a subset of the plurality of candidate destination areas based on a proximity of each of the subset of candidate destination areas, and may visually distinguish visually distinguish the subset from other candidate destination areas. The visual distinguishing may be to recommend one or more advantageous candidate destination areas. The visual distinguishing may be based on any of, or a combination of, a traffic frequency (e.g., robot or human traffic, or a combination thereof) along a path between the candidate robot and each candidate destination area, a number of obstacles between the candidate robot and each candidate destination area, an amount of free space within each candidate destination area, and/or a frequency with which each candidate destination area is used.

The application or central communications system detects 1606 a drag-and-drop gesture within the user interface of the visual representation of the candidate robot being dragged-and-dropped to a visual representation of a candidate destination area of the plurality of candidate destination areas (e.g., robot icon 710 is dragged to destination icon 730). Responsive to detecting the drag-and-drop gesture, the application or central communications system generates 1608 a mission, where the mission causes the candidate robot to autonomously transport an object from the source area to the candidate destination area.

In an embodiment, the application or central communications system generates for display, within the map, a visual representation of an object in the source area (e.g., one or more of objects 810). The application or central communications system may receive a drag gesture from the remote operator with reference to a feature of the object, and may rotate the visual representation of the object based on the drag gesture (e.g., as depicted in destination area 820). The application or central communication system may determine a target orientation of the object based on the rotated visual representation of the object, where generating the mission includes an instruction to unload the object in the candidate destination area based on the target orientation In an embodiment, the application or central communication system may receive a selection on the user map of a point through which the candidate robot must pass. In such a scenario, the mission includes an instruction to the candidate robot to pass through the point when transporting the object from the source area to the destination area.

In an embodiment, the map includes both semantic information and instance information. When executing a mission, the robot may approach the object and may observe that the object abuts another object sharing a same class as the object. The robot may distinguish the object from the another object based on the instance information, and may select a point from which to manipulate the object based on a boundary of the object indicated in the instance information. The semantic information and/or instance information may be populated into the map based on an image captured by the robot being used to cause a given object at a given location to be recognized. For example, the image may be compared to a database of images, where a matching image may be found, and where the matching image is associated with a location of the facility. That location may be imputed to the robot on the basis of the matching. Alternatively or additionally, the semantic information and/or instance information may be populated into the map based on input into the user interface from the remote operator with respect to a position on the map. The mission may be generated at least in part based on the semantic information and/or the instance information. The map may be two-dimensional or three-dimensional.

FIG. 17 depicts an illustrative flowchart of a process for toggling a mode of operation when encountering an obstacle, in accordance with one embodiment. Process 1700 begins with an autonomous mobile robot (e.g., autonomous mobile robot 140) traversing 1702 along a route (e.g., the route depicted in FIG. 9A) based on parameters corresponding to a first mode, the parameters including a first minimum distance to be maintained between the autonomous mobile robot and an obstacle. In an embodiment, the parameters also include a first maximum speed. The autonomous mobile robot determines 1704 that the route cannot be continued without a distance between the autonomous mobile robot and a detected obstacle becoming less than the first minimum distance (e.g., as depicted in FIG. 9A).

Responsive to determining that the route cannot be continued, the autonomous mobile robot determines 1706 (e.g., using mode determination module 337) whether the route can be continued without the distance between the autonomous mobile robot and the detected obstacle becoming less than a second minimum distance less than the first minimum distance, the second minimum distance corresponding to a second mode. Responsive to determining 1708 that the route can be continued without the distance between the autonomous mobile robot and the detected obstacle becoming less than the second minimum distance, the autonomous mobile robot is configured to operate in second mode and continuing traversal of the route (e.g., as depicted in FIG. 9B).

The second mode may be associated with its own parameters, such as a lower maximum speed than a maximum speed associated with the first mode. The speed used in the second mode may be variable based on a type of obstacle encountered (e.g., a lower speed if the obstacle is a human being or something precarious that might move or is moving; a higher speed if the obstacle is static). In an embodiment, the second mode is a candidate mode of a plurality of candidate modes, and wherein the plurality of candidate modes is consulted to determine whether any candidate mode is associated with a minimum distance that is less than or equal to the distance between the autonomous mobile robot and the detected obstacle. For example, different robots may have different accessible modes with different parameters. Each accessible mode to the robot may be consulted (e.g., by querying a database indexing the parameters of each mode), where its minimum distance may be compared to the distance between the robot and the obstacle. The plurality of modes may be consulted responsive to the robot encountering the obstacle.

The autonomous mobile robot may determine while continuing traversal of the route using the second mode, that the robot is no longer within the first minimum distance of the detected obstacle. For example, the robot may have cleared the obstacle. Responsive to determining that the autonomous mobile robot is no longer within the first minimum distance of the obstacle, the autonomous mobile robot may be reconfigured to again operate in the first mode.

FIG. 18 depicts an illustrative flowchart of a process for toggling a traversal protocol of a robot based on a triggering condition, in accordance with one embodiment. Process 1800 begins with a robot (e.g., autonomous mobile robot 140) traversing 1802, using a first traversal protocol, autonomously along a first route that is defined by markers that are detectable by the robot, where the robot is configured to move only based on a presence and type of each marker when the robot is configured to operate based on the first traversal protocol. In an embodiment, while operating based on the first traversal protocol, the robot determines, when encountering each marker, a direction in which the marker is associated, and travels in that direction until reaching another marker.

The robot detects 1804, while traversing along the route, a triggering condition corresponding to a change in operation by the robot from the first traversal protocol to a second traversal protocol (e.g., using traversal protocol module 338). In an embodiment, the robot detects the triggering condition by detecting a final marker that was defined by a user as a last marker for non-autonomous routing, and determining that the triggering condition has been detected responsive to detecting the final marker. The user may have defined the final marker as the last marker for non-autonomous routing by making a selection of the final marker on a map interface. The triggering condition may be a detection of an absence of obstacles or people (e.g., rather than a marker signaling that the second traversal protocol may be used). The triggering condition may be that a boundary has been crossed (e.g., the boundary being a physical boundary, or a logical boundary drawn into a map of the facility). For example, the boundary may be detected using a camera sensor of the robot and/or based on a comparison of a current location of the robot to a boundary indicated in a map.

Responsive to detecting the triggering condition, the robot configures 1806 itself, or receives an instruction from a central communication system (e.g., central communication system 130), to operate in the second traversal protocol, where the robot, when configured to operate based on the second traversal protocol, determines a second route autonomously without regard to a presence of any of the markers.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Upon reading this disclosure, those of skill in the art will appreciate still additional alternative structural and functional designs for a system and a process for operating autonomous mobile robots in a facility through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer readable medium comprising memory with instructions encoded thereon that, when executed, cause one or more processors to perform operations, the instructions comprising instructions to:
    capture, by an autonomous robot, an image of an object to be transported from a source to a destination, wherein the image is a red-green-blue (RGB) image or a gray-scale image;
    generate, by the autonomous robot, a bounding box within the image surrounding the object;
    reduce degrees of freedom of the object to four degrees of freedom by obscuring corner features of the object within the image until the object is constrained to a horizontal position;
    apply, by the autonomous robot, a machine-learned model to the image with the bounding box where the degrees of freedom of the object are reduced, the machine-learned model configured to identify an object type of the object, the object type referencing a category of the object out of a plurality of candidate categories, and to identify features of the object based on the identified object type and the image, at least some of the identified features being occluded and therefore not visible to the autonomous robot but nonetheless determinable by using the identified object type;
    determine, by the autonomous robot, which of the identified features of the object are visible to the autonomous robot; and
    determine, by the autonomous robot, a three-dimensional pose of the object based on the features determined to be visible to the autonomous robot.

2. The non-transitory computer-readable medium of claim 1, wherein the instructions further comprise instructions to:
    determine whether the three-dimensional pose corresponds to a valid state; and
    in response to determining that the three-dimensional pose corresponds to the valid state, manipulate the object.

3. The non-transitory computer-readable medium of claim 2, wherein the instructions further comprise instructions to determine a side of the object that is optimal for manipulation, wherein manipulating the object comprises manipulating the object from the determined side.

4. The non-transitory computer-readable medium of claim 1, wherein the machine-learned model is further configured to output a respective confidence score for each respective identified feature, and wherein the instructions to determine which of the identified features of the object are visible to the autonomous robot comprise instructions to:
    compare each respective confidence score to a threshold; and responsive to determining that a respective confidence score does not meet or exceed the threshold, determine that its respective feature is not visible.

5. The non-transitory computer-readable medium of claim 4, wherein the instructions to determine the three-dimensional pose of the object further comprise instructions to, responsive to determining that no respective feature is visible, determine that the three-dimensional pose is indeterminable.

6. The non-transitory computer-readable medium of claim 5, wherein the instructions further comprise instructions to, responsive to determining that the three-dimensional pose is indeterminable, transmit an alert to a human operator.

7. The non-transitory computer-readable medium of claim 1, wherein the machine-learned model is trained using labeled images, the labels of each image indicating at least one of one or more visible features and an object type.

8. The non-transitory computer-readable medium of claim 1, wherein the instructions further comprise instructions to:
lift, by the autonomous robot, the object, from a side of the object that is selected based on the determined three-dimensional pose; and
transport the object to the destination.

9. The non-transitory computer-readable medium of claim 1, wherein the instructions further comprise instructions to:
capture, by the autonomous robot, depth information representative of the object from a depth sensor of the autonomous robot, wherein the depth information is input into the machine-learned model to identify the features.

10. A method comprising:
capturing, by an autonomous robot, an image of an object to be transported from a source to a destination, wherein the image is a red-green-blue (RGB) image or a grayscale image;
generating, by the autonomous robot, a bounding box within the image surrounding the object;
reducing degrees of freedom of the object to four degrees of freedom by obscuring corner features of the object within the image until the object is constrained to a horizontal position;
applying, by the autonomous robot, a machine-learned model to the image with the bounding box where the degrees of freedom of the object are reduced, the machine-learned model configured to identify an object type of the object, the object type referencing a category of the object out of a plurality of candidate categories, and to identify features of the object based on the identified object type and the image, at least some of the identified features being occluded and therefore not visible to the autonomous robot but nonetheless determinable by using the identified object type;
determining, by the autonomous robot, which of the identified features of the object are visible to the autonomous robot; and
determining, by the autonomous robot, a three-dimensional pose of the object based on the features determined to be visible to the autonomous robot.

11. The method of claim 10, wherein the method further comprises:
determining whether the three-dimensional pose corresponds to a valid state; and
in response to determining that the three-dimensional pose corresponds to the valid state, manipulating the object.

12. The method of claim 11, further comprising determining a side of the object that is optimal for manipulation, wherein manipulating the object comprises manipulating the object from the determined side.

13. The method of claim 10, wherein the machine-learned model is further configured to output a respective confidence score for each respective identified feature, and wherein determining which of the identified features of the object are visible to the autonomous robot comprises:
comparing each respective confidence score to a threshold; and
responsive to determining that a respective confidence score does not meet or exceed the threshold, determining that its respective feature is not visible.

14. The method of claim 13, wherein determining the three-dimensional pose of the object further comprises, responsive to determining that no respective feature is visible, determining that the three-dimensional pose is indeterminable.

15. The method of claim 14, further comprising, responsive to determining that the three-dimensional pose is indeterminable, transmitting an alert to a human operator.

16. The method of claim 10, wherein the machine-learned model is trained using labeled images, the labels of each image indicating at least one of one or more visible features and an object type.

17. The method of claim 10, further comprising:
lifting, by the autonomous robot, the object, from a side of the object that is selected based on the determined three-dimensional pose; and
transporting the object to the destination.

18. A system comprising:
memory with instructions encoded thereon; and
one or more processors, that, when executing the instructions, are configured to perform operations comprising:
capturing, by an autonomous robot, an image of an object to be transported from a source to a destination, wherein the image is a red-green-blue (RGB) image or a grayscale image;
generating, by the autonomous robot, a bounding box within the image surrounding the object;
reducing degrees of freedom of the object to four degrees of freedom by obscuring corner features of the object within the image until the object is constrained to a horizontal position;
applying, by the autonomous robot, a machine-learned model to the image with the bounding box where the degrees of freedom of the object are reduced, the machine-learned model configured to identify an object type of the object, the object type referencing a category of the object out of a plurality of candidate categories, and to identify features of the object based on the identified object type and the image, at least some of the identified features being occluded and therefore not visible to the autonomous robot but nonetheless determinable by using the identified object type;
determining, by the autonomous robot, which of the identified features of the object are visible to the autonomous robot; and
determining, by the autonomous robot, a three-dimensional pose of the object based on the features determined to be visible to the autonomous robot.

* * * * *